United States Patent
Qian et al.

(10) Patent No.: US 12,019,325 B1
(45) Date of Patent: Jun. 25, 2024

(54) DISPLAY PANEL AND DISPLAY DEVICE

(71) Applicant: Shanghai Tianma Micro-Electronics Co., Ltd., Shanghai (CN)

(72) Inventors: Yongli Qian, Shanghai (CN); Jian Zhao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/312,746

(22) Filed: May 5, 2023

(30) Foreign Application Priority Data

Feb. 17, 2023 (CN) .......................... 202310130062.3

(51) Int. Cl.
  *G02F 1/1333* (2006.01)
  *B60K 35/50* (2024.01)
  *G09G 3/36* (2006.01)
  *B60K 35/22* (2024.01)

(52) U.S. Cl.
  CPC ........ *G02F 1/133382* (2013.01); *B60K 35/50* (2024.01); *G09G 3/3677* (2013.01); *B60K 35/22* (2024.01); *G09G 2310/0286* (2013.01); *G09G 2330/045* (2013.01)

(58) Field of Classification Search
  CPC .............. G02F 1/133382; B60K 37/04; B60K 2370/152; G09G 3/3677; G09G 2310/0286; G09G 2330/045
  See application file for complete search history.

(56) References Cited

U.S. PATENT DOCUMENTS

| 2005/0073642 A1* | 4/2005 | Dunn ................ G02F 1/133382 349/199 |
| 2021/0383755 A1* | 12/2021 | Kawachi ............. G09G 3/3233 |
| 2022/0320241 A1* | 10/2022 | Zhou .................... H10K 59/131 |

FOREIGN PATENT DOCUMENTS

| CN | 111679479 A | * | 9/2020 | ....... G02F 1/133382 |
| CN | 111679479 A | | 9/2020 | |
| CN | 112859416 A | * | 5/2021 | ....... G02F 1/133382 |
| KR | 20060087929 A | * | 8/2006 | ....... G02F 1/133382 |

OTHER PUBLICATIONS

English Machine Translation of Kim, Pub. No. KR 20060087929 (Year: 2023).*
English Machine Translation of Fang CN 112 859 416 (Year: 2023).*
English Machine Translation of Zhao CN 111 679 479 (Year: 2023).*

* cited by examiner

*Primary Examiner* — Donald L Raleigh
(74) *Attorney, Agent, or Firm* — CHRISTENSEN O'CONNOR JOHNSON KINDNESS PLLC

(57) ABSTRACT

A display panel includes heating lines each including part located in a display region, and a heating bus and a power supply pin located in a non-display region. The heating bus is electrically connected to the power supply pin and the heating lines. The display region includes first and second sub-regions, the heating lines include first and second heating lines. One first heating line is located in the first sub-region. One second heating line is located in the second sub-region. A length of the heating bus connected between one first heating line and the power supply pin is greater than a length of heating bus connected between one second heating line and the power supply pin. An arrangement density of first heating line is greater than that of the second (Continued)

heating line, or a resistance of the first heating line is smaller than that of the second heating line.

20 Claims, 23 Drawing Sheets

DISPLAY PANEL AND DISPLAY DEVICE

CROSS-REFERENCE TO RELATED APPLICATIONS

The present application claims priority to Chinese Patent Application No. 202310130062.3, filed on Feb. 17, 2023, the content of which is incorporated herein by reference in its entirety.

TECHNICAL FIELD

The present disclosure relates to the field of display technology, and in particular, to a display panel and a display device.

BACKGROUND

With the diversification of the appearance design of a display panel, a display screen having a strip shape has been widely used in various display fields. For example, in the field of vehicle-mounted display, a vehicle-mounted display screen can be a display screen having a horizontal strip shape or a vertically strip shape. The display screen having a horizontal strip shape can be arranged under a windshield, serve as a large continuous screen of a vehicle, and configured to display music, video and other information. The display screen having a vertical strip shape can be arranged at a central control region and configured to display information such as vehicle parameters.

A vehicle is a transportation means used outdoors, and a temperature of a vehicle is easily affected by a temperature of an external environment. Most of the vehicle-mounted display screens are liquid crystal display screens. When the temperature is low, the viscosity of the liquid crystal molecules increases and the response time thereof increases, thereby easily resulting in problems such as deterioration of image quality and smearing of dynamic images, and even display failure of the display screen in serious cases. As a result, driving safety may be affected.

In this regard, it is proposed in the related art that heating lines can be provided in the display panel. However, based on the existing design manner of the heating lines, the display panel is prone to problems such as uneven heating, especially for a display screen having a strip shape. As a result, the heating effect of the display screen is seriously affected.

SUMMARY

In an aspect, an embodiment of the present disclosure provides a display panel having a display region and a non-display region. The display panel includes heating lines, and at least one heating bus and at least one power supply pin that are located in the non-display region. Each of the heating lines includes at least part located in the display region. The at least one heating bus is electrically connected to the at least one power supply pin and the heating lines. The display region includes a first sub-region and at least one second sub-region, the heating lines include at least one first heating line and at least one second heating line, one of the at least one first heating line is located in the first sub-region, and one of the at least one second heating line is located in one of the at least one second sub-region. A length of one of the at least one heating bus connected between one of the at least one first heating line and one of the at least one power supply pin is greater than a length of the one of the at least one heating bus connected between one of the at least one second heating line and the one of the at least one power supply pin. An arrangement density of the at least one first heating line is greater than an arrangement density of the at least one second heating line, and/or, a resistance of one of the at least one first heating line is smaller than a resistance of one of the at least one second heating line.

In an aspect, an embodiment of the present disclosure provides a display device including a display panel. The display panel has a display region and a non-display region. The display panel includes heating lines, and at least one heating bus and at least one power supply pin that are located in the non-display region. Each of the heating lines includes at least part located in the display region. The at least one heating bus is electrically connected to the at least one power supply pin and the heating lines. The display region includes a first sub-region and at least one second sub-region, the heating lines include at least one first heating line and at least one second heating line, one of the at least one first heating line is located in the first sub-region, and one of the at least one second heating line is located in one of the at least one second sub-region. A length of one of the at least one heating bus connected between one of the at least one first heating line and one of the at least one power supply pin is greater than a length of the one of the at least one heating bus connected between one of the at least one second heating line and the one of the at least one power supply pin. An arrangement density of the at least one first heating line is greater than an arrangement density of the at least one second heating line, and/or, a resistance of one of the at least one first heating line is smaller than a resistance of one of the at least one second heating line.

BRIEF DESCRIPTION OF DRAWINGS

In order to better illustrate technical solutions in embodiments of the present disclosure, the accompanying drawings used in the embodiments are briefly introduced as follows. The drawings described as follows are merely part of the embodiments of the present disclosure, and other drawings can also be acquired by those skilled in the art without paying creative efforts.

DESCRIPTION OF EMBODIMENTS

For better illustrating technical solutions of the present disclosure, embodiments of the present disclosure will be described in detail as follows with reference to the accompanying drawings.

The described embodiments are merely exemplary embodiments of the present disclosure, which shall not be interpreted as providing limitations to the present disclosure. All other embodiments obtained by those skilled in the art according to the embodiments of the present disclosure fall within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A alone, A and B, B alone. The character "/" herein generally indicates that the related objects before and after the character form an "or" relationship.

Figure 1:
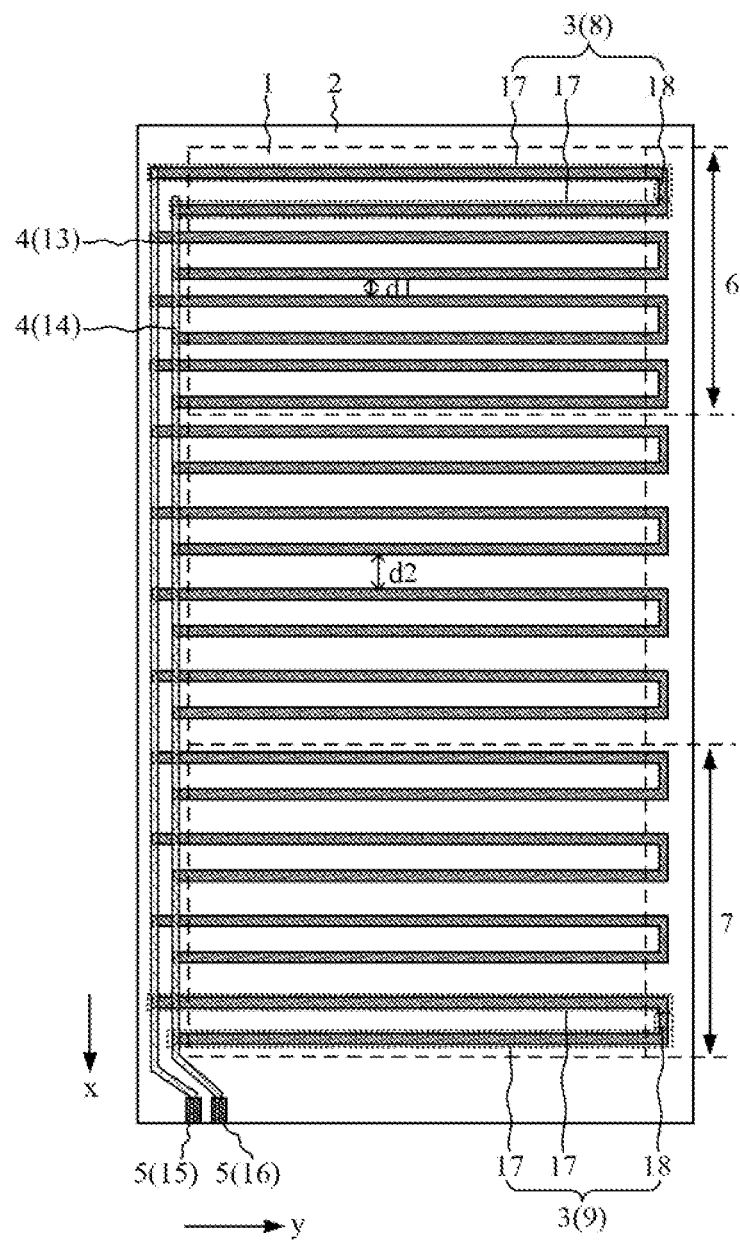
FIG. 1 is a schematic structural diagram of a display panel provided by an embodiment of the present disclosure.
Figure 2:
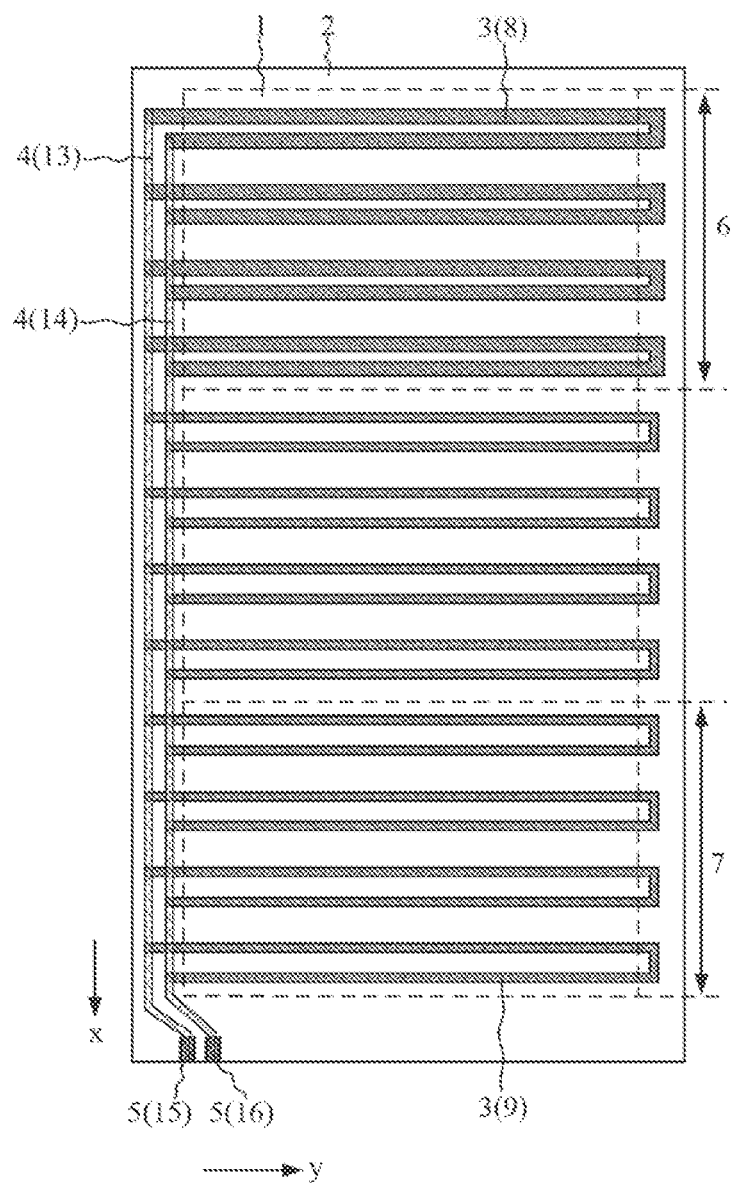
FIG. 2 is another schematic structural diagram of a display panel provided by an embodiment of the present disclosure.
Figure 3:
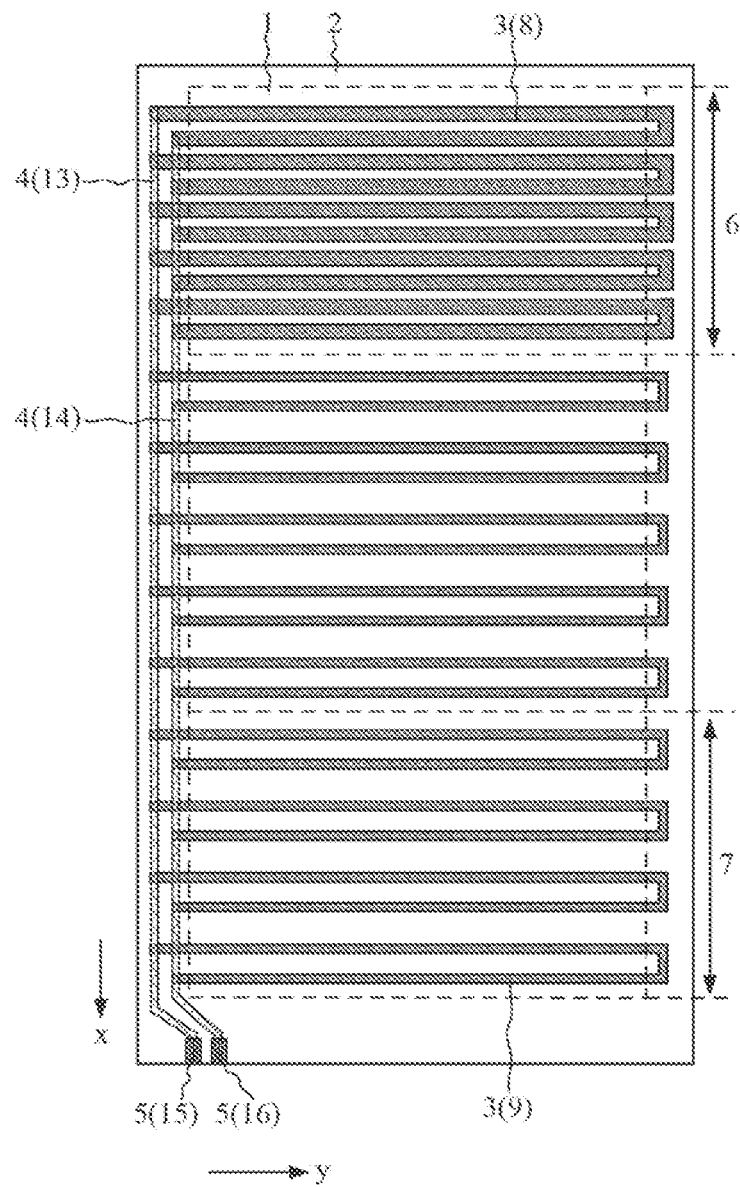
FIG. 3 is another schematic structural diagram of a display panel provided by an embodiment of the present disclosure.

FIG. 1 is a schematic structural diagram of a display panel provided by an embodiment of the present disclosure. FIG. 2 is another schematic structural diagram of a display panel provided by an embodiment of the present disclosure. FIG. 3 is another schematic structural diagram of a display panel provided by an embodiment of the present disclosure. Some embodiments of the present disclosure provide a display panel, as shown in FIG. 1 to FIG. 3. The display panel has a display region 1 and a non-display region 2. The display panel includes heating lines 3, a heating bus 4 and a power supply pin 5. At least part of each heating line 3 is located in the display region 1. The heating bus 4 and the power supply pin 5 are located in the non-display region 2. The heating bus 4 is connected to the power supply pin 5 and each heating line 3. In some embodiments, the heating bus 4 is in a shape of a line.

The display region 1 includes a first sub-region 6 and a second sub-region 7. The heating lines 3 include a first heating line 8 and a second heating line 9. At least one first heating line 8 is located in the first sub-region 6, and at least one second heating line 9 is located in the second sub-region 7.

A length of the heating bus 4 between the first heating line 8 and the power supply pin 5 is greater than a length of the heating bus 4 between the second heating line 9 and the power supply pin 5. An arrangement density of the first heating lines 8 is greater than an arrangement density of the second heating lines 9, and/or, a resistance of the first heating line 8 is smaller than a resistance of the second heating line 9.

The above-mentioned "the length of the heating bus 4 between the heating line 3 and the power supply pin 5" refers to a length of a transmission path along which a heating signal output by the power supply pin 5 is transmitted from the heating bus 4 to the heating line 3, rather than a straight-line distance between the heating line 3 and the power supply pin 5. For example, when the heating bus 4 and the heating line 3 are arranged in different layers and the two are connected through a connection via, the length of the heating bus 4 between the heating line 3 and the power supply pin 5 refers to a length between the connection via (connected between the heating bus 4 and the heating line 3) and the power supply pin 5; and when the heating bus 4 and the heating line 3 are arranged in a same layer, the length of the heating bus 4 between the heating line 3 and the power supply pin 5 refers to a length between an end of the heating line 3 connected to the heating bus 4 and the power supply pin 5.

Figure 4:
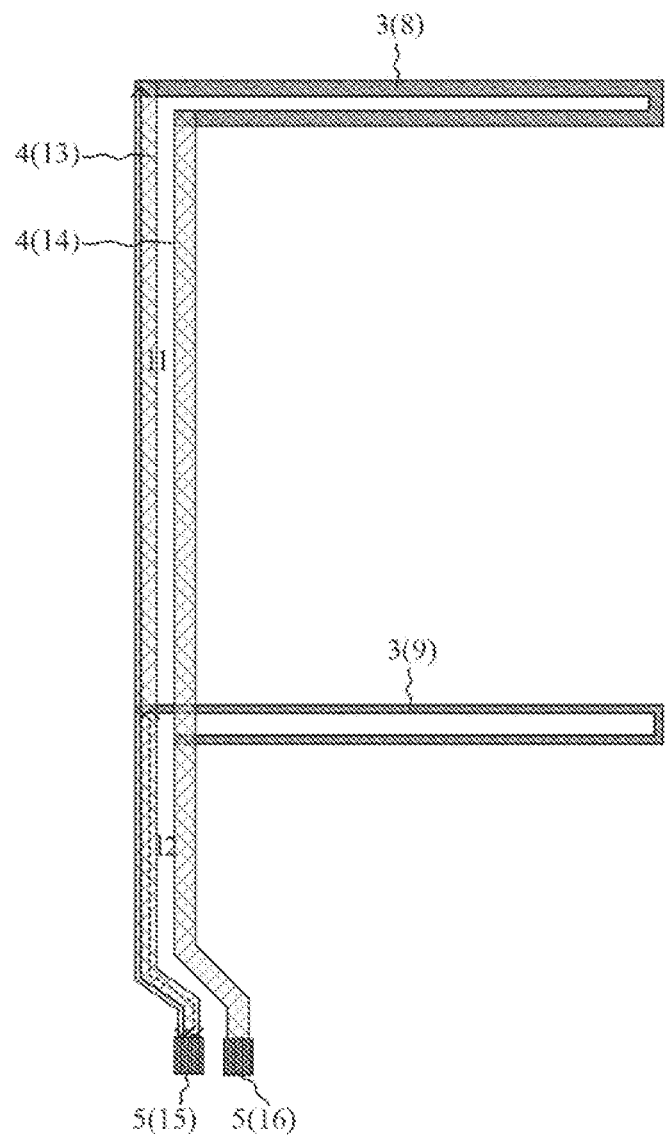
FIG. 4 is a schematic diagram of a length of a heating bus between a heating line and a power supply pin provided by an embodiment of the present disclosure.

FIG. 4 is a schematic diagram of a length of a heating bus 4 between a heating line 3 and a power supply pin 5 provided by an embodiment of the present disclosure. As shown in FIG. 4, which illustrates a length 11 and a length 12, 11 (solid arrow) indicates a length of the heating bus 4 between the first heating line 8 and the power supply pin 5, and 12 (dotted arrow) indicates a length of the heating bus 4 between the second heating line 9 and the power supply pin 5.

During heating of the display panel, when the heating signal output by the power supply pin 5 is transmitted to the heating line 3 at different positions via the heating bus 4, the transmission paths of the heating signal on the heating bus 4 are different. For example, the power supply pin 5 is located at a lower border of the display panel, the transmission path of the heating signal corresponding to the heating line 3 close to the lower border is shorter, and the transmission path of the heating signal corresponding to the heating line 3 farther from the lower border is longer.

Since there is impedance on the heating bus 4, the longer the transmission path of the heating signal on the heating bus 4, the greater the decay of a heating voltage. According to the power formula $$P = \frac{U^2}{R},$$

it is known that when the heating voltage decays greatly, the heating power of the heating line 3 will be greatly reduced, leading to large differences in the heating power of the heating line 3 at different positions, resulting in non-uniform heating of the display panel. Especially for an elongated-shaped display panel, the lengths of the transmission paths of the heating signals corresponding to the heating lines 3 at different positions are more different, leading to more serious non-uniform heating of the display panel.

In an embodiment of the present disclosure, the length of the heating bus 4 between the first heating line 8 and the power supply pin 5 is greater than the length of the heating bus 4 between the second heating line 9 and the power supply pin 5. Therefore, when the heating signal is transmitted to the first heating line 8, the heating signal has a longer transmission path on the heating bus 4, so that the heating voltage has a greater degree of decay.

In this regard, an embodiment of the present disclosure adjusts an arrangement density and/or resistance of the first heating lines 8, so as to increase the heating power of the first heating line 8 per unit area by utilizing a structural difference between the first heating line 8 and the second heating line 9. For example, since the heating lines 3 are connected in parallel with each other, when the arrangement density of the first heating lines 8 is increased, the number of the first heating lines 8 arranged in a unit area can be increased, thereby reducing an equivalent resistance of the first heating line 8 per unit area. Combining with the formula of the heating power, it is known that after reducing the equivalent resistance of the first heating line 8 per unit area, the overall heating power of the first heating line 8 per unit area can be increased. When reducing the resistance of the first heating line 8, in combination with the formula of the heating power, it is known that the heating power of a single first heating line 8 can be increased, and thus the overall heating power of the first heating line 8 per unit area can also be increased.

To sum up, the embodiments of the present disclosure can increase the heating power of the first heating line 8 per unit area by differentially designing the arrangement density and/or resistance of the first heating line 8 and the second heating line 9, thereby compensating the reduced heating power caused by the voltage decay by utilizing the increased heating power. In this way, a difference in terms of the heating effect between the first sub-region 6 and the second sub-region 7 can be weakened, thereby improving the in-plane heating uniformity. Especially for strip-shaped display panel, the improvement effect is more significant.

In the embodiments of the present disclosure, when designing the arrangement density or resistance of the first heating lines 8, a simulation test may be performed based on a panel structure in which the heating lines 3 are arranged at a same density and the heating lines 3 have a same resistance to obtain a difference between the heating power distribution density in the first sub-region 6 and the heating power distribution density in the second sub-region 7, and then a degree of difference in the arrangement density and/or resistance of the heating lines 3 in the two sub-regions can be designed based on a degree of difference in the heating power distribution density in the two sub-regions. For example, when the simulation shows that the heating power distribution density in the second sub-region 7 is twice the heating power distribution density in the first sub-region 6, the arrangement density of the first heating lines 8 can be designed as twice the arrangement density of the second heating lines 9.

In an embodiment of the present disclosure, with reference to FIG. 2 and FIG. 3, a line width of the first heating line 8 is greater than a line width of the second heating line 9.

The greater the line width of the heating line 3, the larger a cross-sectional area S of the heating line 3, and the smaller the resistance of the heating line 3 according to the formula $$R = \frac{\rho L}{S}.$$

Therefore, when the line width of the first heating line 8 is increased, the resistance of the first heating line 8 can be reduced, thereby achieving differentiated design of the resistance of the first heating line 8 and the resistance of the second heating line 9.

Figure 5:
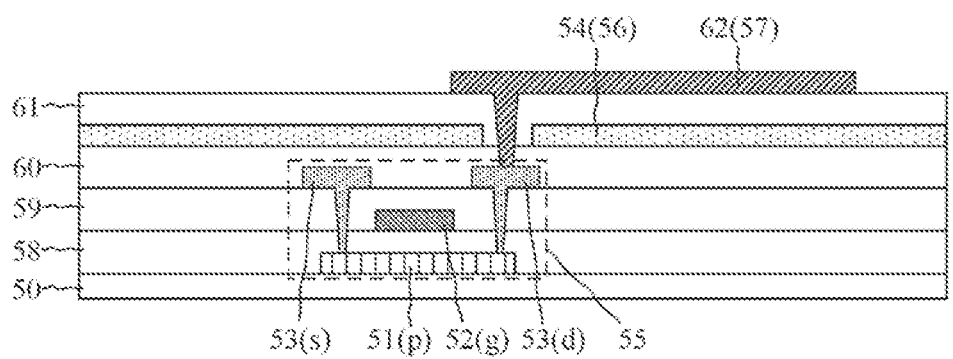
FIG. 5 is a schematic diagram of a layer structure of a display panel provided by an embodiment of the present disclosure.

It can be understood that the display panel includes multiple electric-conductive layers, and at least some of the electric-conductive layers adopt different electric-conductive materials. For example, as shown in FIG. 5, which is a schematic diagram of a layer structure of a display panel provided by an embodiment of the present disclosure, the display panel may include a first substrate 50, a semiconductor layer 51, a first metal layer 52, a second metal layer 53, a first oxide semiconductor layer 54 and a second oxide semiconductor layer 62. The semiconductor layer 51 is used for forming structures such as an active layer p of the control transistor 55. The first metal layer 52 is used for forming structures such as a gate electrode g of the control transistor 55 and a scanning signal line Scan. The second metal layer 53 is used for forming structures such as a first electrode s and a second electrode d of the control transistor 55, and a data line Data. The first oxide semiconductor layer 54 is used for forming structures such as a common electrode 56. The second oxide semiconductor layer 62 is used for forming structures such as a pixel electrode 57.

A gate insulating layer 58 may be provided between the semiconductor layer 51 and the first metal layer 52, an interlayer insulating layer 59 may be provided between the first metal layer 52 and the second metal layer 53, a planarization layer 60 may be provided between the second metal layer 53 and the first oxide semiconductor layer 54, and an electrode insulating layer 61 may be provided between the first oxide semiconductor layer 54 and the second oxide semiconductor layer 62.

The layer structure shown in FIG. 5 merely represents one of the embodiments of the present disclosure, in which the thin film transistor has a top gate structure. In other embodiments of the present disclosure, the thin film transistor may have a bottom gate structure.

In an embodiment of the present disclosure, the first heating line 8 and the second heating line 9 may be arranged in a same layer. That is, the first heating line 8 and the second heating line 9 may be formed by using a same material and a same mask, and the first heating line 8 and the second heating line 9 have a same resistivity and a same layer thickness. In this case, by adjusting a pattern of the mask plate, the line width of the first heating line 8 can be different from the line width of the second heating line 9, so as to achieve the differentiated design of the resistances of the two heating lines 3.

Figure 6:
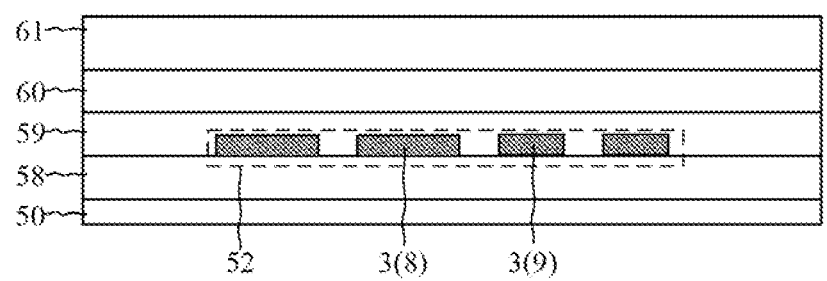
FIG. 6 is a schematic diagram of a layer position of a heating line provided by an embodiment of the present disclosure.

FIG. 6 is a schematic diagram of a layer position of a heating line provided by an embodiment of the present disclosure. In an example, as shown in FIG. 6, both the first heating line 8 and the second heating line 9 may be located in the first metal layer 52. Alternatively, both the first heating line 8 and the second heating line 9 may be located in the second metal layer 53. Alternatively, both the first heating line 8 and the second heating line 9 may be located in the second oxide semiconductor layer 62.

Figure 8:
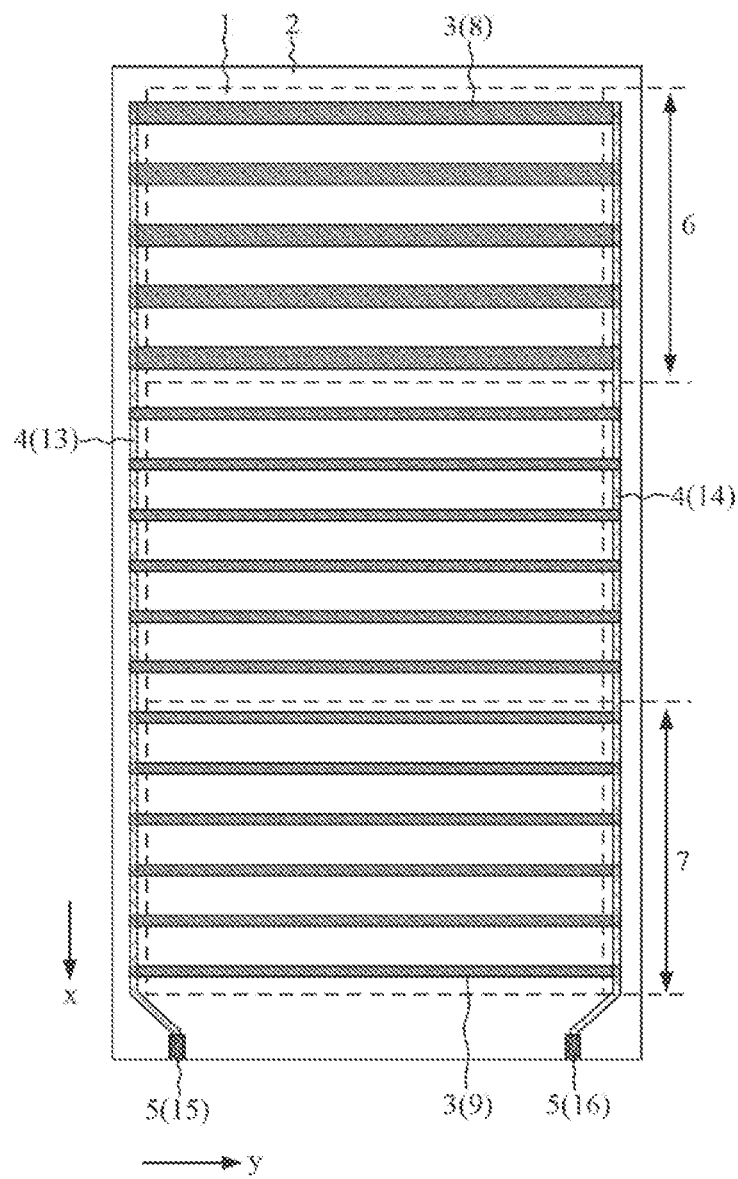
FIG. 8 is another schematic structural diagram of a display panel provided by an embodiment of the present disclosure.

The heating line 3 in the embodiments of the present disclosure can have various extension manners. For example, with reference to FIG. 2 and FIG. 3, the heating line 3 may have a U-shaped structure. Alternatively, as shown in FIG. 8, which is another structural schematic diagram of a display panel provided by an embodiment of the present disclosure, the heating line 3 may have a strip-shaped structure, that is, the heating line 3 may have a line-shaped structure. When the heating line 3 has a strip-shaped structure, the line width of the first heating line 8 can be greater than the line width of the second heating line 9, so as to reduce the resistance of the first heating line 8.

In an embodiment of the present disclosure, the resistivity of the first heating line 8 is smaller than the resistivity of the second heating line 9.

According to the formula $$R = \frac{\rho L}{S},$$

the resistance is proportional to the resistivity ρ. Therefore, when the resistivity of the first heating line 8 is reduced, the resistance of the first heating line 8 can be reduced, thereby achieving the differentiated design of the resistance of the first heating line 8 and the resistance of the second heating line 9.

As mentioned above, the display panel may include a first metal layer 52, a second metal layer 53, a first oxide semiconductor layer 54 and a second oxide semiconductor layer 62. The first oxide semiconductor layer 54 and the second oxide semiconductor layer 62 are usually formed by the indium tin oxides (ITO) material, and the resistivity of the indium tin oxides material is generally greater than that of the metal material.

Figure 7:
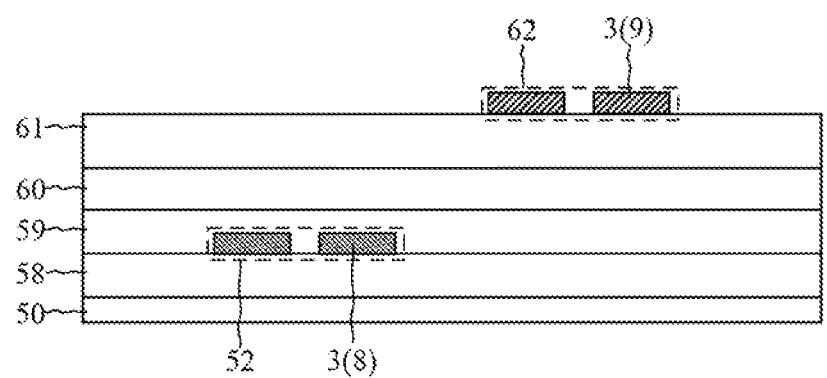
FIG. 7 is a schematic diagram of another layer position of a heating line provided by an embodiment of the present disclosure.

In an embodiment of the present disclosure, the first heating line 8 and the second heating line 9 may be located in different layers, so that the first heating line 8 and the second heating line 9 can be formed by different electric-conductive materials and thus the first heating line 8 and the second heating line 9 can have different resistivity. Exemplarily, as shown in FIG. 7, which is a schematic diagram of another layer position of a heating line provided by an embodiment of the present disclosure, the first heating line 8 is located in the first metal layer 52, and the second heating line 9 is located in the second oxide semiconductor layer 62. Alternatively, the first heating line 8 is located in the second metal layer 53, and the second heating line 9 is located in the second oxide semiconductor layer 62.

Figure 9:
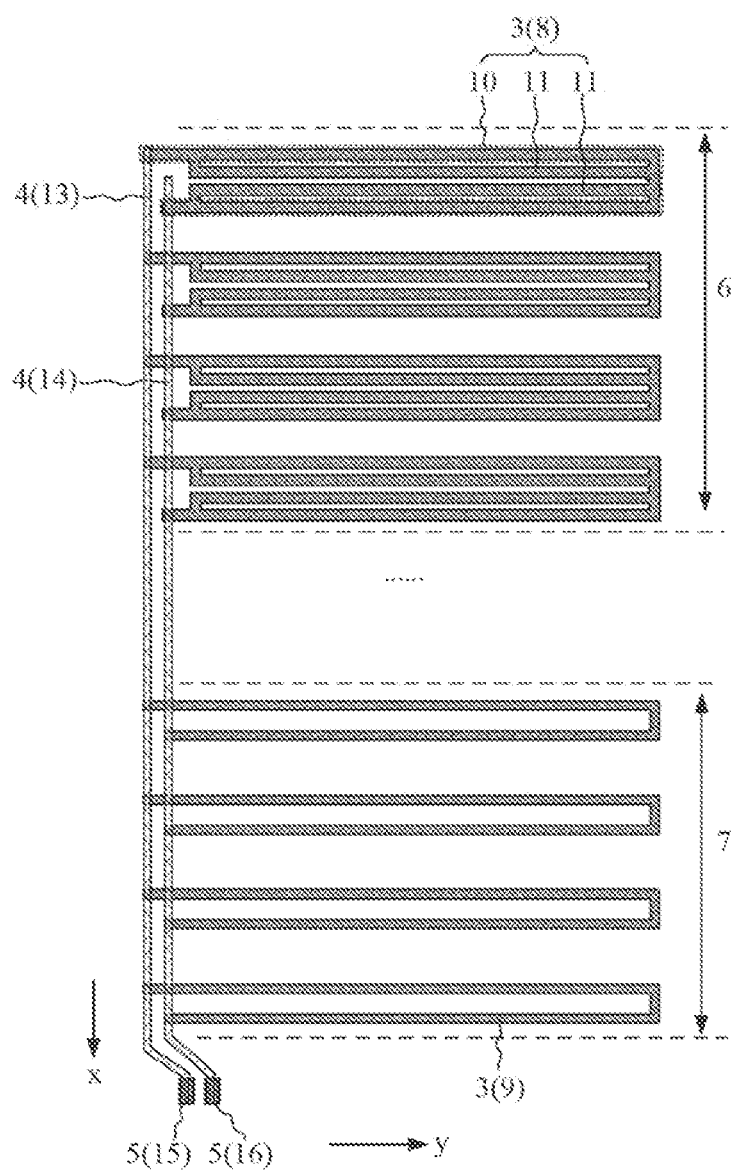
FIG. 9 is another schematic structural diagram of a display panel provided by an embodiment of the present disclosure.

FIG. 9 is another schematic structural diagram of a display panel provided by an embodiment of the present disclosure. In an embodiment of the present disclosure, the first heating line 8 includes a first line segment 10 and at least one second line segment 11. The first line segment 10 is connected to the heating bus 4, and the second line segment 11 is connected in parallel with the first line segment 10 to reduce the resistance of the first heating line 8, thereby achieving the differentiated design of the resistance of the first heating line 8 and the resistance of the second heating line 9.

Figure 10:
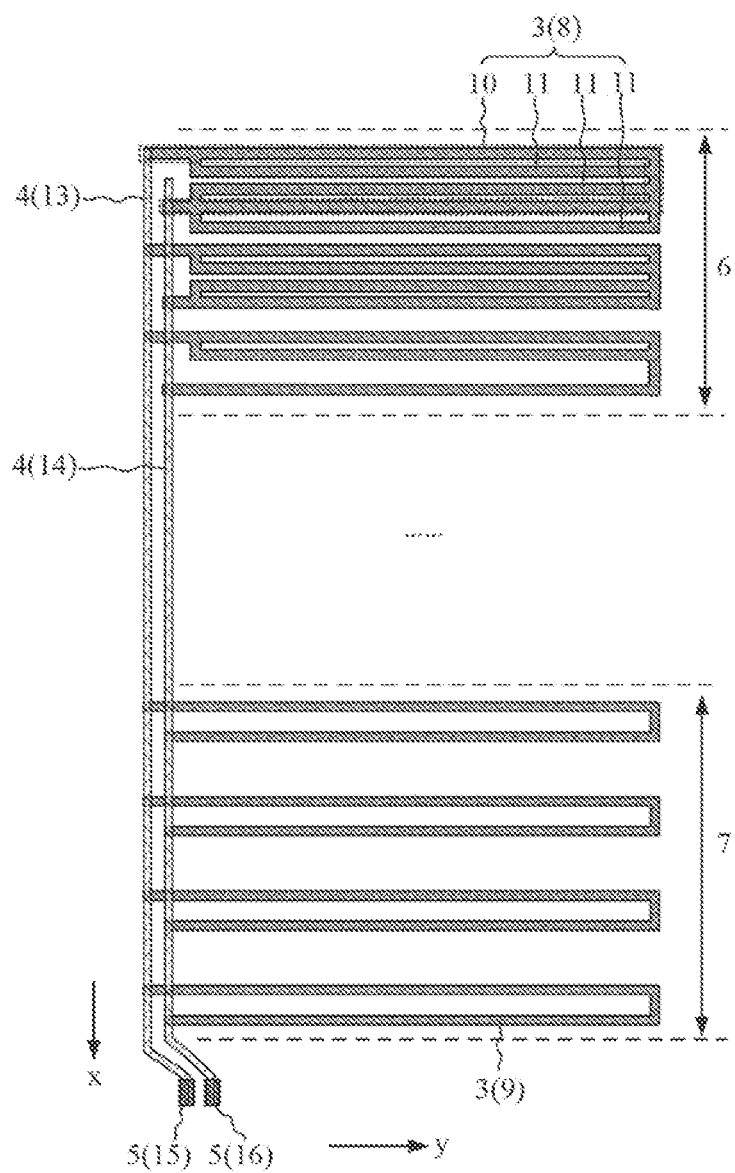
FIG. 10 is another schematic structural diagram of a display panel provided by an embodiment of the present disclosure.

FIG. 10 is another schematic structural diagram of a display panel provided by an embodiment of the present disclosure. As shown in FIG. 10, along a direction from the first sub-region 6 to the second sub-region 7, the number of the second line segments 11 of the first heating lines 8 decreases. In this way, along the direction from the first sub-region 6 to the second sub-region 7, the resistances of the first heating lines 8 in the first sub-region 6 increases, thereby achieving the uniform transition of the heating power from the first sub-region 6 to the second sub-region 7.

In an embodiment of the present disclosure, with reference to FIG. 1, a distance d1 between two adjacent first heating lines 8 is smaller than a distance d2 between two adjacent second heating lines 9.

By making the distance d1 between two adjacent first heating lines 8 smaller, the arrangement density of the first heating lines 8 can be greater, thereby achieving the differentiated design of the arrangement density of the first heating lines 8 and the arrangement density of the second heating lines 9.

In an embodiment of the present disclosure, with reference to FIG. 1 to FIG. 3, the display region 1 and the power supply pin 5 are arranged along the first direction x. The heating bus 4 includes a first heating bus 13 and a second heating bus 14, and the power supply pin 5 includes a first power supply pin 15 electrically connected to the first heating bus 13 and a second power supply pin 16 electrically connected to the second heating bus 14. The first power supply pin 15 is configured to provide a first power supply signal, and the second power supply pin 16 is configured to provide a second power supply signal. The first power supply signal is transmitted along the first heating bus 13 to an end of the heating line 3, and the second power supply signal is transmitted along the second heating bus 14 to another end of the heating line 3, so that the heating line 3 heats up under an action of the electric-current.

The heating lines 3 are arranged along the first direction x. The first heating bus 13 and the second heating bus 14 extend from at least one side of the display region 1 in the second direction y to the power supply pin 5 connected thereto. The first direction x intersects the second direction y.

In this configuration, the first sub-region 6 and the second sub-region 7 are arranged along the first direction x, and the first sub-region 6 is located at a side of the second sub-region 7 away from the power supply pin 5.

Figure 11:
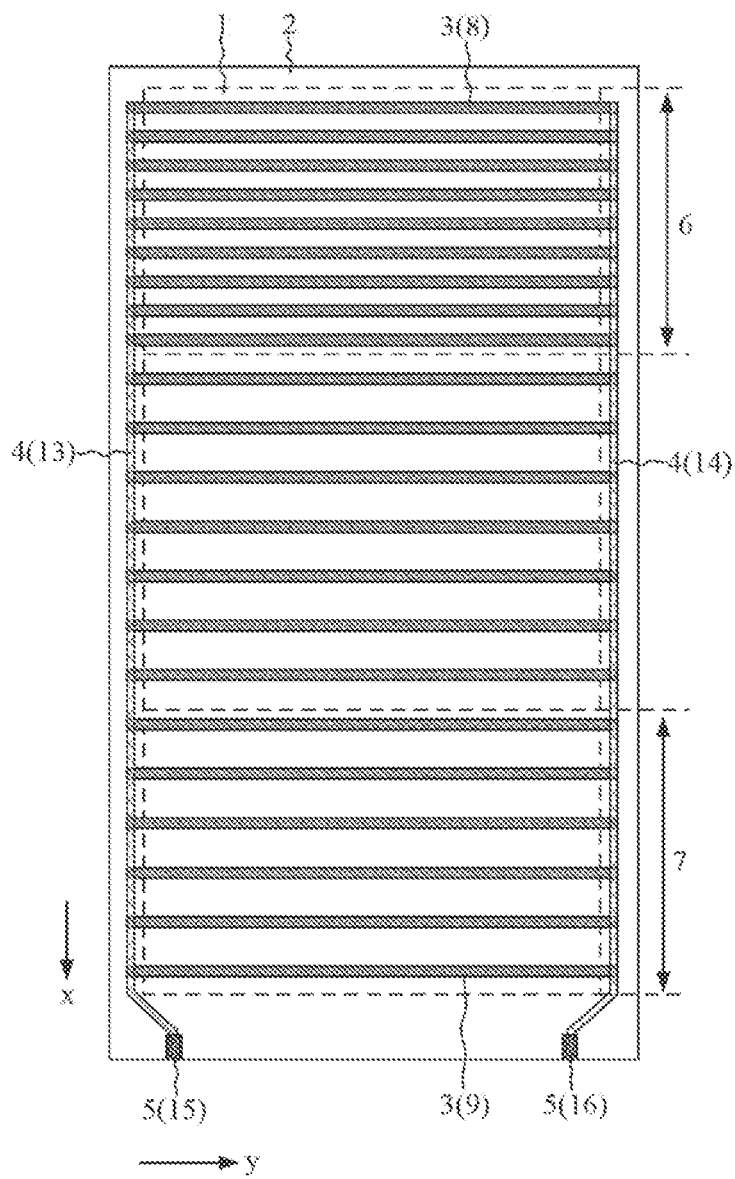
FIG. 11 is another schematic structural diagram of a display panel provided by an embodiment of the present disclosure.

With reference to FIG. 1 to FIG. 3, the heating line 3 can be a U-shaped structure. In this case, the first heating bus 13 extends from a side of the display region 1 in the second direction y to the first power supply pin 15 connected to it, and the second heating bus 14 extends from the same side of the display region 1 in the second direction y to the second power supply pin 16 connected thereto. Alternatively, as shown in FIG. 11, which is another schematic structural diagram of a display panel provided by an embodiment of the present disclosure, the heating line 3 may have a strip-shaped structure extending along a straight line. In this case, the first heating bus 13 extends from a side of the display region 1 in the second direction y to the first power supply pin 15 connected to it, and the second heating bus 14 extends from another side of the display region 1 in the second direction y to the second power supply pin 16 connected thereto.

According to the position of the power supply pin 5 and the extension manner of heating bus 4 described above, the further the heating signal is transmitted along the heating bus 4 to the top of the display panel (an end away from the power supply pin 5), the longer the transmission path is, and the greater the degree of decay of the voltage. Therefore, when designing the positions of the first sub-region 6 and the second sub-region 7 in some embodiments of the present disclosure, the first sub-region 6 can be arranged at a side of the second sub-region 7 away from the power supply pin 5. For example, a top region of the display region 1 away from the power supply pin 5 is configured as the first sub-region 6, and a bottom region of the display region 1 close to the power supply pin 5 is configured as the second sub-region 7. In this way, the heating power at the top of the display panel can be significantly increased by utilizing the difference in the arrangement density and/or the resistance of the heating lines 3 in the two sub-regions. Therefore, the heating uniformity between the top of the display panel and the bottom of the display panel can be improved.

With reference to FIG. 1, FIG. 2, FIG. 3 and FIG. 11, a size of the display panel in the first direction x is larger than a size of the display panel in the second direction y. In this case, the display panel has strip-shaped structure, which can be used as a display screen provided at a central control position of a vehicle.

By making the heating line 3 be arranged along the first direction x in a display panel having a strip-shaped structure, no matter whether the heating line 3 adopts a U-shaped structure or a strip-shaped structure, an extension length of a single heating line 3 will not be too large. In this case, when the display panel is heated, the heating line 3 can quickly heat up under an action of the heating voltage, thereby improving the heating efficiency.

Figure 12:
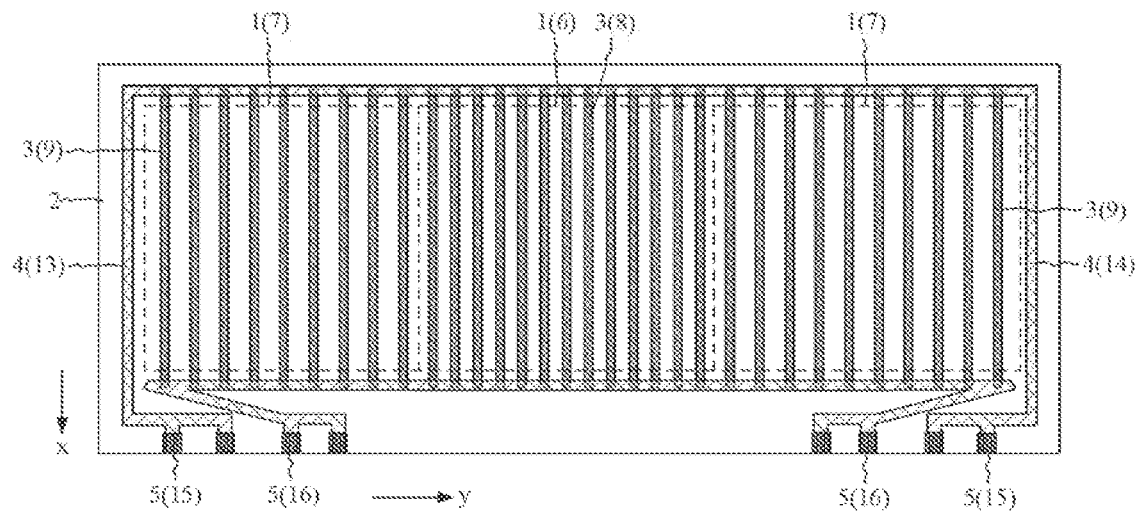
FIG. 12 is another schematic structural diagram of a display panel provided by an embodiment of the present disclosure.
Figure 13:
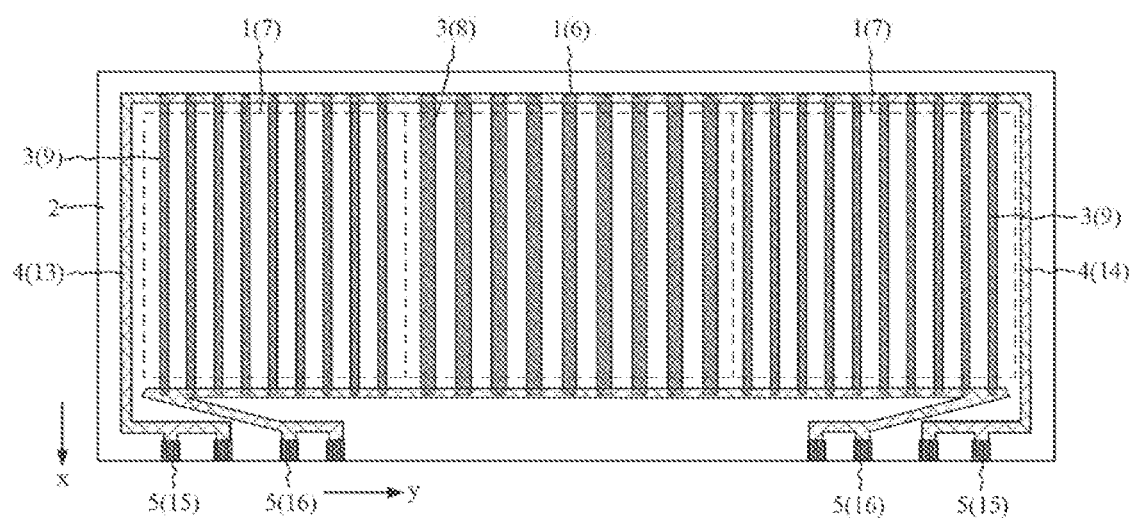
FIG. 13 is another schematic structural diagram of a display panel provided by an embodiment of the present disclosure.
Figure 14:
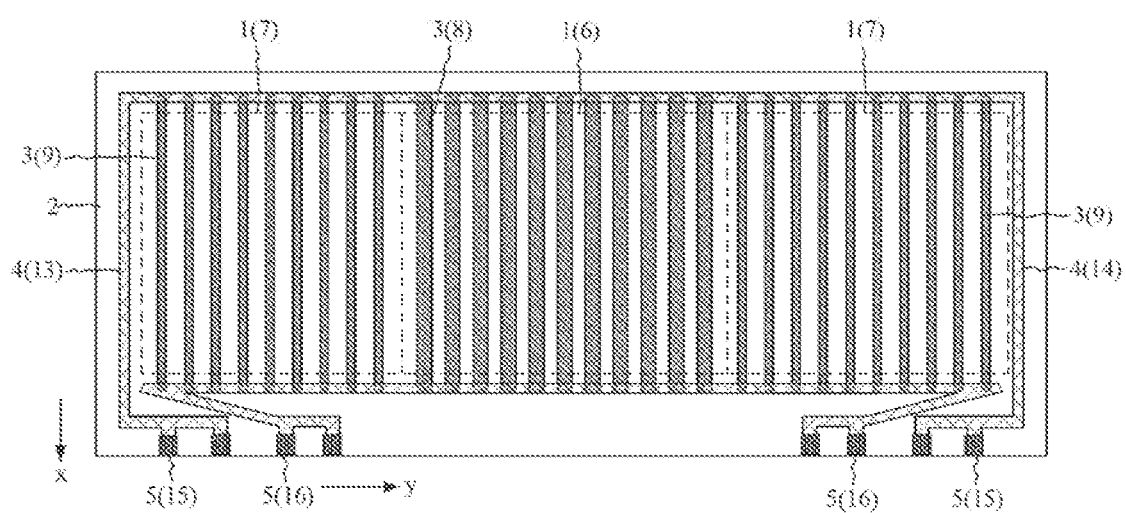
FIG. 14 is another schematic structural diagram of a display panel provided by an embodiment of the present disclosure.

FIG. 12 is another schematic structural diagram of a display panel provided by an embodiment of the present disclosure. FIG. 13 is another schematic structural diagram of a display panel provided by an embodiment of the present disclosure. FIG. 14 is another schematic structural diagram of a display panel provided by an embodiment of the present disclosure. Alternatively, in an embodiment of the present disclosure, as shown in FIG. 12 to FIG. 14, the display region 1 and the power supply pin 5 are arranged along the first direction x. The heating bus 4 includes a first heating bus 13 and a second heating bus 14, and the power supply pin 5 includes a first power supply pin 15 electrically connected to the first heating bus 13 and a second power supply pin 16 electrically connected to the second heating bus 14.

The heating lines 3 are arranged along the second direction y, and the first direction x intersects the second direction y. The first heating bus 13 surrounds the display region 1 and is electrically connected to an end of each heating line 3 away from the power supply pin 5. The second heating bus 14 is located at a side of the display region 1 close to the power supply pin 5 and is electrically connected to an end of each heating line 3 close to the power supply pin 5. In addition, two ends of the first heating bus 13 are connected to the first power supply pin 15, and two ends of the second heating bus 14 are connected to the second power supply pin 16.

In this configuration, the display region 1 includes two second sub-regions 7. The first sub-region 6 and the second sub-region 7 are arranged along the second direction y. The first sub-region 6 is located between the two second sub-regions 7.

According to the position of the power supply pin 5 and the extension manner of heating bus 4 described above, the further the heating signal is transmitted along the heating bus 4 to a center of the display panel, the longer the transmission path is, and the greater the degree of decay of the voltage. Therefore, in some embodiments of the present disclosure, when designing the positions of the first sub-region 6 and the second sub-region 7, a region at the center of the display panel can be configured as the first sub-region 6, and a region at two edges of the display panel can be configured as the two second sub-regions 7. Then, by increasing the arrangement density of the first heating lines 8 in the first sub-region 6 at the center and/or reducing the resistance of the first heating lines 8 in the first sub-region 6 at the center, the heating power at the center of the display panel can be increased, thereby effectively increasing the heating uniformity between the center of the display panel and the two edges of the display panel.

With reference to FIG. 12 to FIG. 14 again, a size of the display panel in the second direction y is larger than a size of the display panel in the first direction x. In this case, the display panel is a horizontal strip-shaped display panel, which can be, for example, arranged under a windshield and serve as a large continuous screen of a vehicle.

The heating lines 3 are arranged along the second direction y in the horizontal strip-shaped display panel, so that an extension length of a single heating line 3 is not too large. In this way, when heating the display panel, the heating lines 3 can quickly heat up under an action of the heating voltage, thereby improving the heating efficiency.

In an embodiment of the present disclosure, with reference to FIG. 1, the heating line 3 has a U-shaped structure, and the heating line 3 includes two first heating line segments 17 extending in a same direction and one second heating line segment 18 located between the two first heating line segments 17. The second heating line segment 18 is located in the non-display region 2.

The second heating line segment 18 is arranged in the non-display region 2. In this way, on the one hand, it can avoid that the second hearting line 9 blocks the display region 1 and increase an aperture ratio of the display panel; and on the other hand, when heating the display panel, the second heating line segment 18 can increase the temperature in the non-display region 2, thereby heating the devices in the non-display region 2, so as to prevent these devices from failing at a low temperature.

Figure 15:
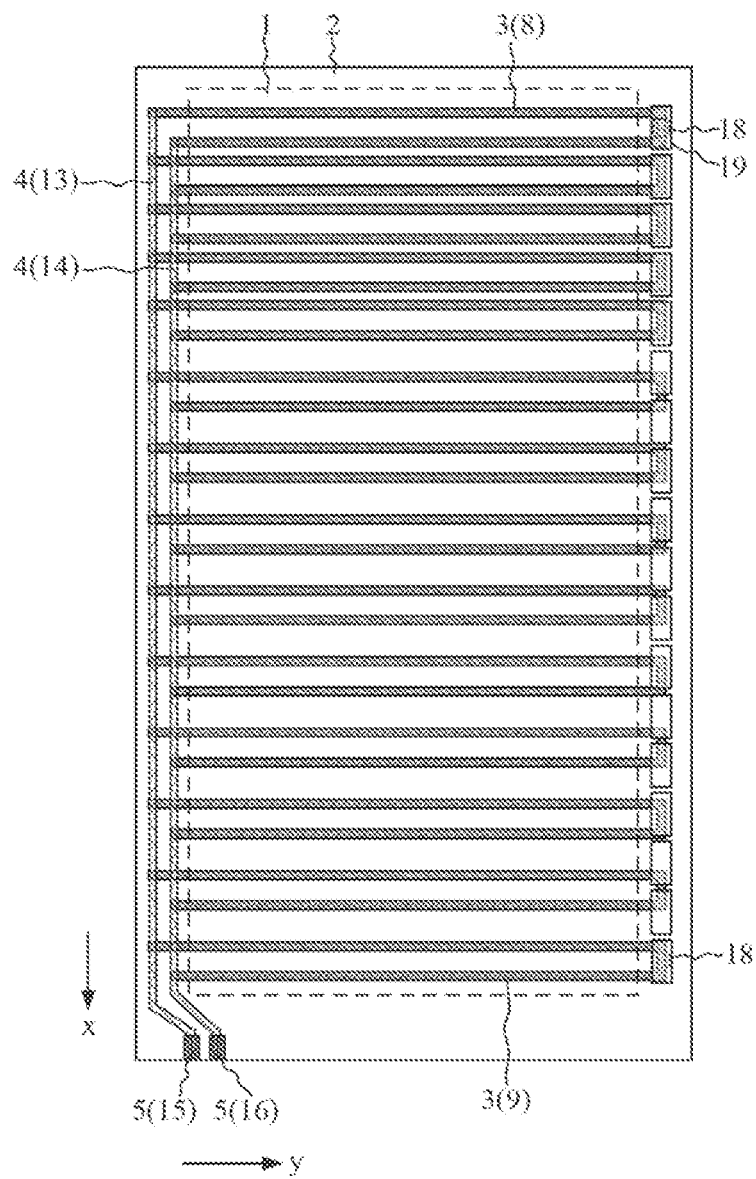
FIG. 15 is another schematic structural diagram of a display panel provided by an embodiment of the present disclosure.

FIG. 15 is another schematic structural diagram of a display panel provided by an embodiment of the present disclosure. In an embodiment of the present disclosure, as shown in FIG. 15, the display panel includes a dummy sub-pixel 19 located in the non-display region 2. In a direction perpendicular to a plane of the display panel, the second heating line segment 18 overlaps with the dummy sub-pixel 19.

The dummy sub-pixel 19 is configured to improve the etching uniformity at an edge of the display region 1 during a process of the display panel. The dummy sub-pixel 19 is not used for image displaying. Therefore, when the second heating line segment 18 overlaps with the dummy sub-pixel 19, it does not need to consider whether the second heating line segment 18 blocks an aperture of the dummy sub-pixel 19. In this way, when designing a size of the heating line 3, the second heating line segment 18 can be designed to be wider than the first heating line segment 17, thereby improving the design flexibility of the heating line 3. For example, a line width of the second heating line segment 18 of the first heating line 8 can be designed to be larger, to reduce the resistance of the first heating line 8. In addition, such a configuration can also reduce a total width of the frame that is occupied by the second heating line segment 18 and the dummy sub-pixel 19, thereby being beneficial to a narrow frame design of the display panel.

Figure 16:
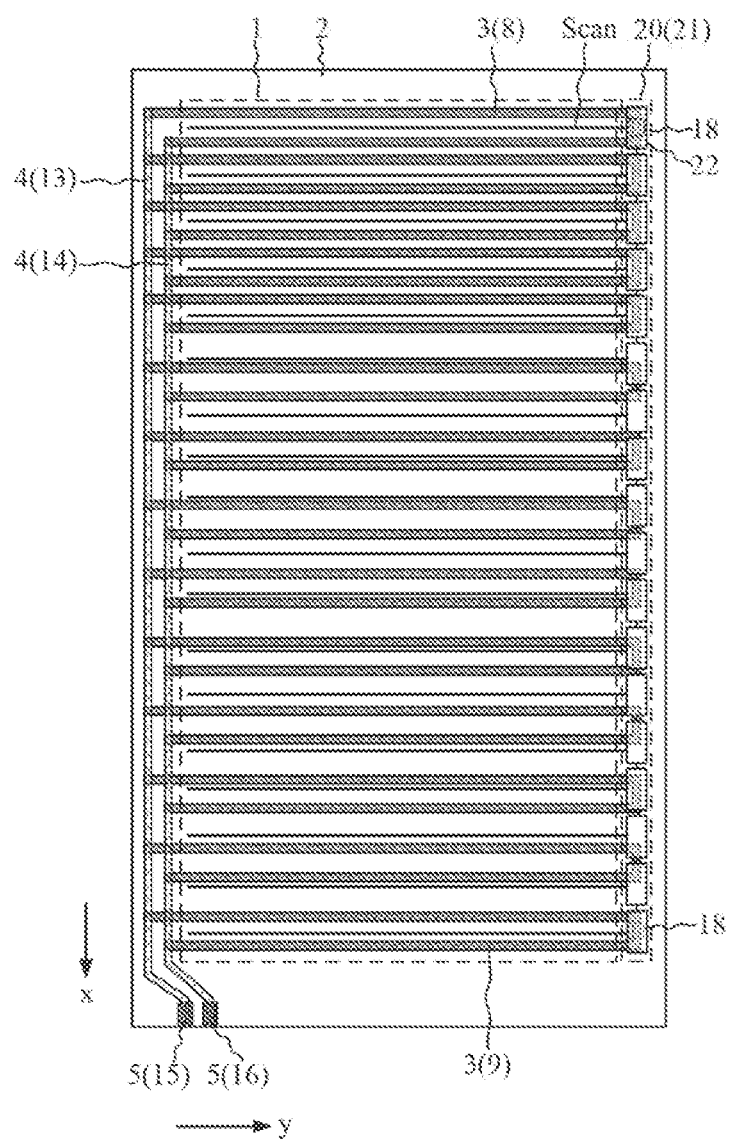
FIG. 16 is another schematic structural diagram of a display panel provided by an embodiment of the present disclosure.

FIG. 16 is another schematic structural diagram of a display panel provided by an embodiment of the present disclosure. In an embodiment of the present disclosure, as shown in FIG. 16, the display panel includes a circuit 20 located in the non-display region 2. In a direction perpendicular to a plane of the display panel, the second heating line segment 18 overlaps with the circuit 20. In this case, when heating the display panel, the second heating line segment 18 is also used to heat the circuit 20 in the frame, thereby preventing the transistor in the circuit 20 from failing at a low temperature. In addition, such a configuration can reduce a total width of the frame that is occupied by the second heating line segment 18 and the circuit 20, hereby being beneficial to a narrow frame design of the display panel.

With reference to FIG. 16, a scanning signal line Scan is provided in the display region 1 and extends along the second direction y, and the circuit 20 includes a shift register circuit 21 electrically connected to the scanning signal line Scan. The shift register circuit 21 is located at one side or two sides of the display region 1 in the second direction y. For example, the shift register circuit 21 may include cascaded shift units 22, which are electrically connected to the scanning signal lines Scan.

The first heating line segment 17 extends along the second direction y. In the direction perpendicular to the plane of the display panel, the second heating line segment 18 overlaps with the shift register circuit 21. In this case, when heating the display panel, the temperature at a position where the shift register circuit 21 is located can also be increased, thereby preventing the transistor in the shift register circuit 21 from failing at a low temperature. In this way, the scanning signal line Scan has increased driving reliability in terms of driving the shift register circuit 21, thereby improving the display performance of the display panel.

The second heating line segment 18 overlaps with the shift register circuit 21. For example, the second heating line segment 18 may overlap with an electrical device in the shift register circuit 21 or may overlap with a connection line of the shift register circuit 21. The connection line herein may refer to a connection line connecting the shift register circuit 21 and the driver chip, or a connection line connecting the scanning signal line Scan and the shift register circuit 21.

Figure 17:
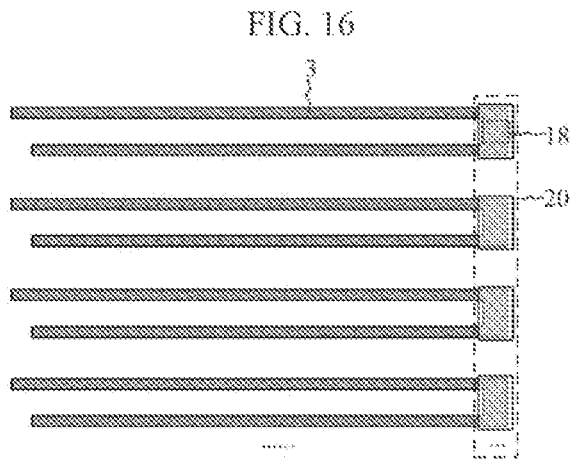
FIG. 17 is a schematic diagram of a partial structure of a display panel provided by an embodiment of the present disclosure.

FIG. 17 is a schematic diagram of a partial structure of a display panel provided by an embodiment of the present disclosure. In an embodiment of the present disclosure, as shown in FIG. 17, a line width of the second heating line segment 18 is greater than a line width of the first heating line segment 17, so as to increase a heating area of the second heating line segment 18 in the frame, thereby improving the heating effect of the second heating line segment 18 on the electronic devices in the frame. For example, when the second heating line segment 18 overlaps with the circuit 20, low-temperature failure of devices in the circuit 20 can be avoided to a greater extent, thereby ensuring the normal operation of the circuit 20. When the second heating line segment 18 overlaps with the dummy sub-pixel 19, although the dummy sub-pixel 19 is not used for image displaying, it is still expected to avoid failure of the electronic device in the display panel as much as possible, so the second heating line 18 can also be used to effectively protect the electronic device in the dummy sub-pixel 19 from low temperature.

Figure 18:
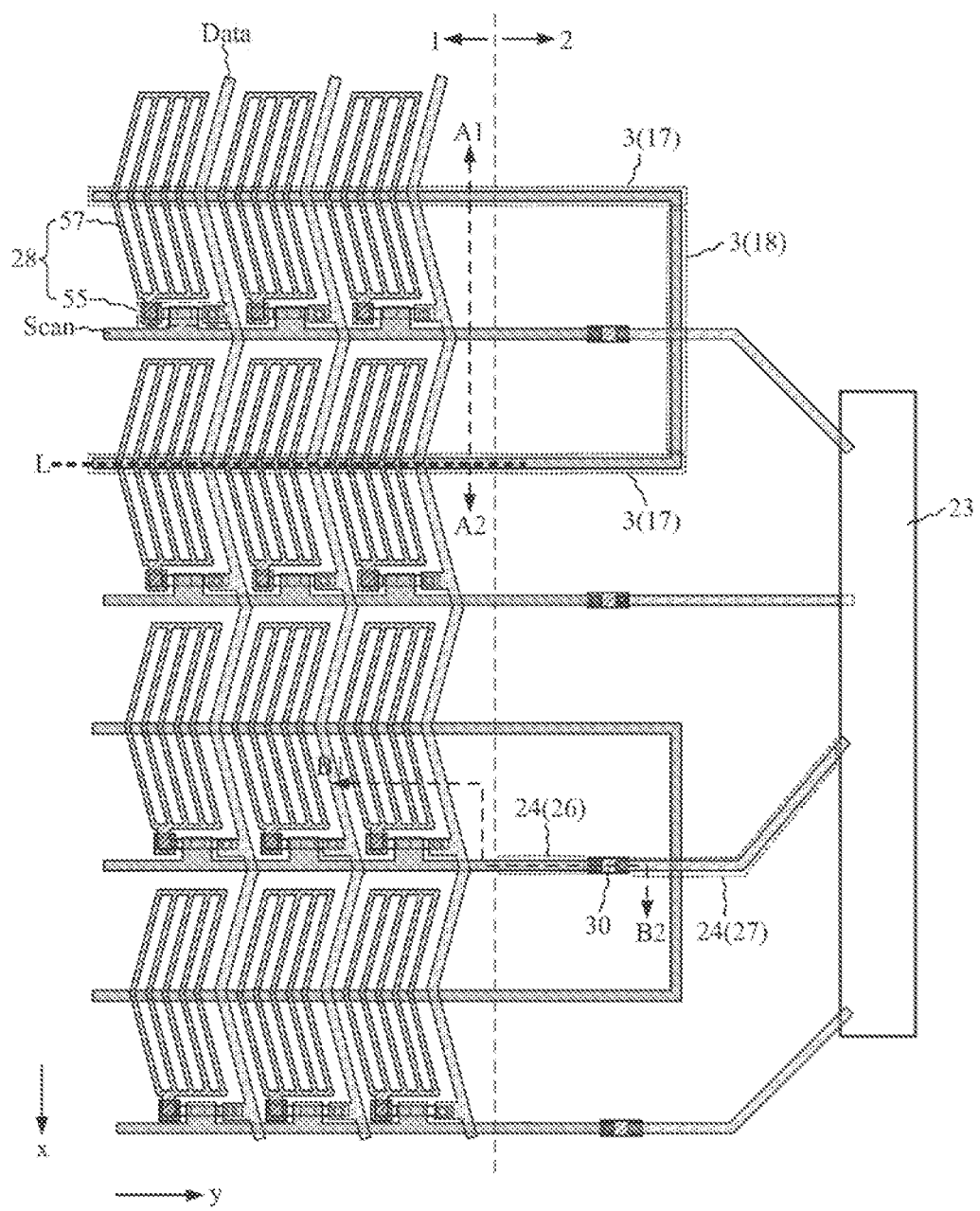
FIG. 18 is a schematic diagram of a layer structure of a display panel provided by an embodiment of the present disclosure.
Figure 19:
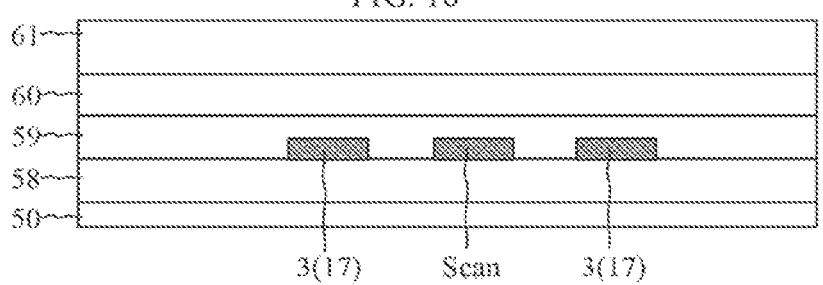
FIG. 19 is a cross-sectional view along A1-A2 shown in FIG. 18.

FIG. 18 is a schematic diagram of a layer structure of a display panel provided by an embodiment of the present disclosure. FIG. 19 is a cross-sectional view along A1-A2 shown in FIG. 18. In an embodiment of the present disclosure, as shown in FIG. 18 and FIG. 19, the display region 1 includes a scanning signal line Scan extending along the second direction y, the first heating line segment 17 extends along the second direction y, and the heating line 3 and the scanning signal line Scan are arranged in a same layer.

The first heating line 8 that extends in the display region 1 extends in the same direction as the scanning signal line Scan. Therefore, when the two are arranged in a same layer, on the one hand, the extension directions of the two do not cross, thereby avoiding a risk of short circuit; and on the other hand, an additional process for the heating line 3 is not required, and the heating line 3 and the scanning signal line Scan can be formed using a same mask, thereby simplifying a process thereof and reducing process cost.

The display sub-pixel 28 shown in FIG. 18 is a true dual domain sub-pixel. In this case, a part of the heating line 3 extending along the second direction y can overlap with an inter-connection line L of the display sub-pixel 28. Such a structure will be described in detail in the following embodiments.

Figure 20:
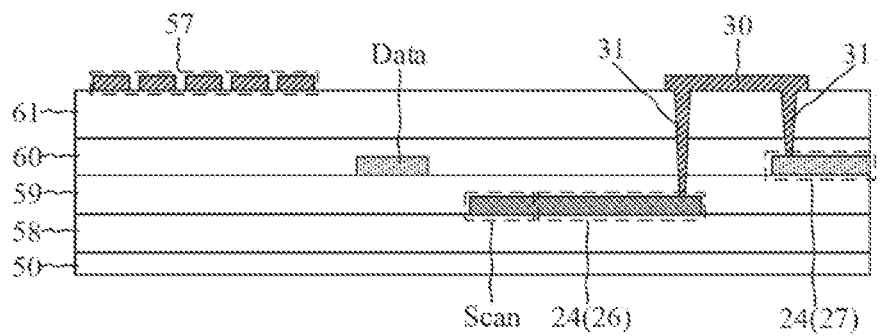
FIG. 20 is a cross-sectional view along B1-B2 shown in FIG. 18.

FIG. 20 is a cross-sectional view along B1-B2 shown in FIG. 18. In an embodiment of the present disclosure, the heating line 3 and the scanning signal line Scan are arranged in a same layer, in combination with FIG. 18 and FIG. 20, a gate drive circuit 23 is provided in the non-display region 2, and the scanning signal line Scan is electrically connected to the gate drive circuit 23 through a connection line 24 extending in the non-display region 2.

The gate drive circuit 23 may include a gate drive chip. In this case, the scanning signal line Scan is electrically connected to a pin in the gate drive chip through the connection line 24. In some embodiments, the gate drive circuit 23 may include a shift register circuit, and the scanning signal line Scan is electrically connected to the shift unit in the shift register circuit through the connection line 24.

The connection line 24 may include a first connection line segment 26 and a second connection line segment 27 electrically connected to the first connection line segment 26. The first connection line segment 26 and the scanning signal line Scan are arranged in a same layer, and the second connection line segment 27 and the scanning signal line Scan are arranged in different layers. In a direction perpendicular to the plane of the display panel, the second heating line segment 18 overlaps with the second connection line segment 27.

When the heating line 3 and the scanning signal line Scan are arranged in a same layer, an extension direction of the second connection line segment 27 extending in the non-display region 2 may cross an extension direction of the connection line 24. For this reason, the second connection line segment 27 of the connection line 24 and the scanning signal line Scan are arranged in different layers, and the second heating line segment 18 overlaps with the second connection line segment 27, so that a short circuit between the second heating line 9 and the second connection line segment 27 can be avoided, thereby improving the reliability of a signal transmitted on the heating line 3 and the scanning signal line Scan.

In an embodiment of the present disclosure, with reference to FIG. 18 and FIG. 20, a data line Data is provided in the display region 1, and an extension direction of the data line Data intersects the second direction y. The second connection line segment 27 and the data line Data may be arranged in a same layer. A display sub-pixel 28 is provided in the display region 1, and the display sub-pixel 28 includes a pixel electrode 57. The first connection line segment 26 is bridge-connected to the second connection line segment 27 through an auxiliary connection part 30 provided in the same layer as the pixel electrode 57.

As described above, with reference to FIG. 5, the display panel includes a first metal layer 52, a second metal layer 53, a first oxide metal layer, and a second oxide semiconductor layer 62. When the first connection line segment 26 and the scanning signal line Scan are arranged in a same layer, the first connection line segment 26 is located in the first metal layer 52; and when the second connection line segment 27 and the data line Data are arranged in a same layer, the second connection line segment 27 is located in the second metal layer 53.

In a related process of the display panel, there is no hole-forming process between the first metal layer 52 and the second metal layer 53, and there is a hole-forming process between the second oxide semiconductor layer 62 and the second metal layer 53. For example, a mask needs to be used to form a connection via in an insulating layer between the second oxide semiconductor layer 62 and the second metal layer 53, so as to connect the pixel electrode 57 and the control transistor.

In some embodiments of the present disclosure, the first connection line segment 26 and the second connection line segment 27 are not directly connected to each other via a connection via, but bridge-connected to each other through an auxiliary connection part 30 provided in the same layer as the pixel electrode 57. In this way, a mask for forming a connection via between the first metal layer 52 and the second metal layer 53 is not required. Instead, it merely needs to adjust a pattern of the mask for forming a connection via between the second oxide semiconductor layer 62 and the second metal layer 53, so as to form a connection via between the pixel electrode 57 and the pixel driving circuit, a connection via between the auxiliary connection part 30 and the second connection line segment 27, and a connection via between the auxiliary connection part 30 and the first connection line segment 26. In this way, a process thereof can be simplified, and the process cost can be reduced.

Although the depth of the via between the auxiliary connection part 30 and the depth of the via between the second connection line segment 27 and the first connection line segment 26 are different from each other, it is still possible to simultaneously form such vias having different depths by controlling an amount of light transmitted through the mask at different positions.

Figure 21:
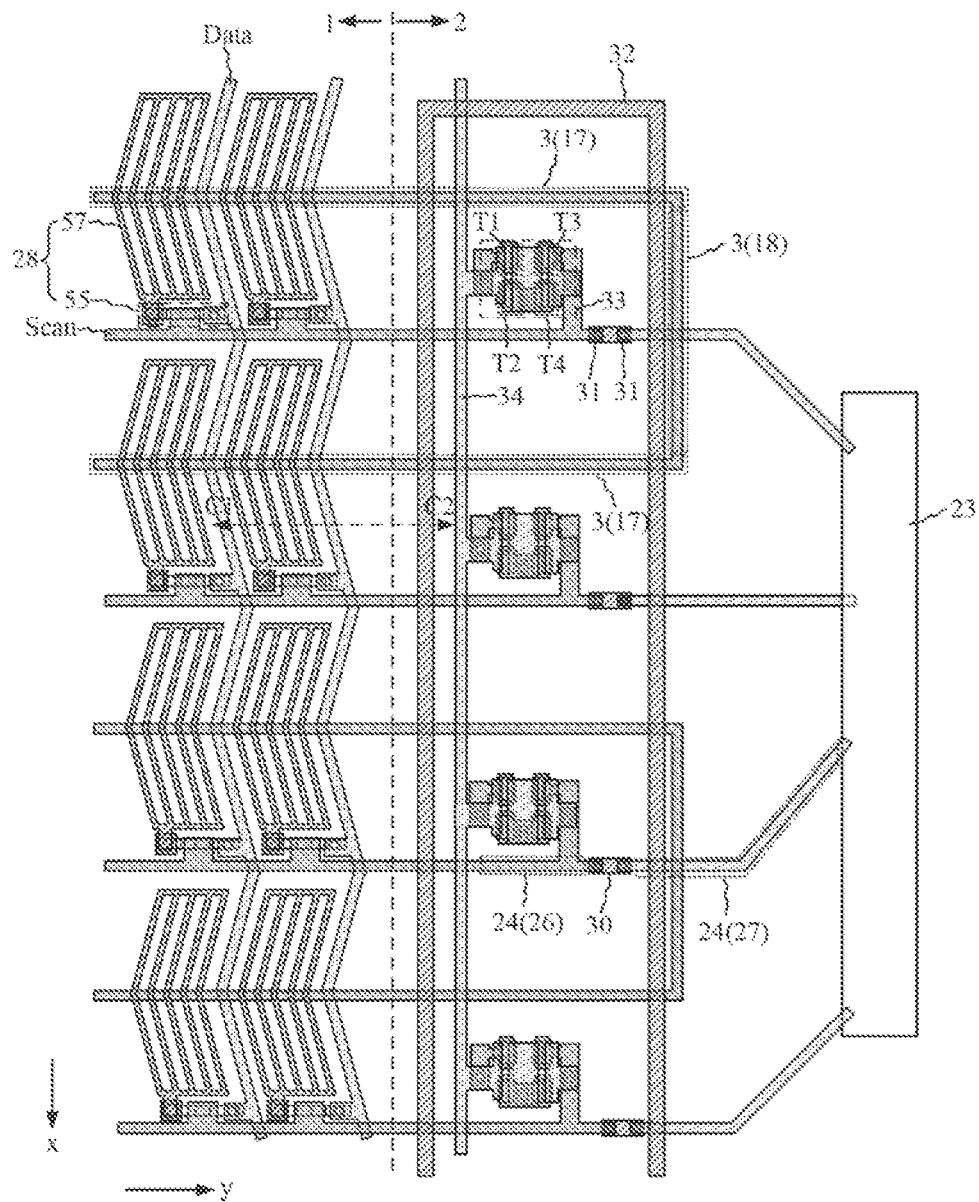
FIG. 21 is a schematic diagram of another layer structure of a display panel provided by an embodiment of the present disclosure.

FIG. 21 is a schematic diagram of another layer structure of a display panel provided by an embodiment of the present disclosure. In an embodiment of the present disclosure, as shown in FIG. 21, the first connection line segment 26 and the second connection line segment 27 are electrically connected to each other through a connection via 31, and the connection vias 31 may include a connection via between the auxiliary connection part 30 and the first connection line segment 26 and a connection via between the auxiliary connection part 30 and the second connection line segment 27.

A protective line 32 can be provided in the non-display region 2. The protective line 32 surrounds multiple connection vias 31. The protective line 32 receives a first voltage, which is lower than a low-level voltage received by the scanning signal line Scan, and the low-level voltage received by the scanning signal line Scan serves as an effective level and/or a turn-off level.

In general, electrochemical corrosion is more likely to occur at positions with lower potentials in the display panel. In some embodiments of the present disclosure, a protective line 32 for receiving a lower potential is provided to surround the connection vias 31. In this case, even if electrochemical corrosion occurs, it is more likely to occur at a position of the protective line 32 with a lower potential, so that the protective line 32 can reduce a risk of electrochemical corrosion occurring at the position of connection via 31. In this way, the connection reliability of the first connection line segment 26 and the second connection line segment 27 can be improved.

Figure 22:
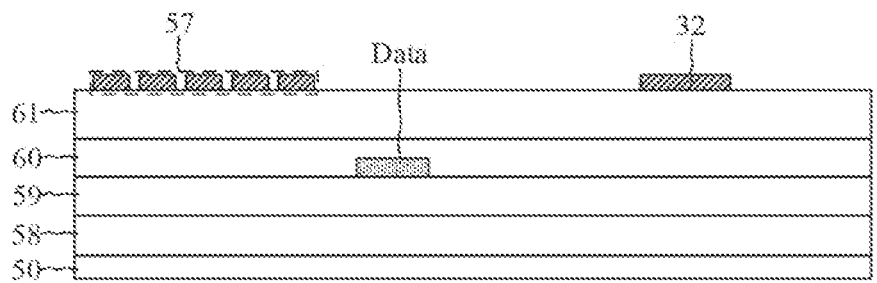
FIG. 22 is a cross-sectional view along C1-C2 shown in FIG. 21.

FIG. 22 is a cross-sectional view along C1-C2 shown in FIG. 21. With reference to FIG. 21 and FIG. 22, the protective line 32 and the pixel electrode 57 are arranged in a same layer.

As described above, the first connection line segment 26 can be arranged in the same layer as the scanning signal line Scan, and the second connection line segment 27 can be arranged in the same layer as the data line Data. In this case, if the protective line 32 is also arranged in the same layer as the scanning signal line Scan or the data line Data, since an extension direction of the protective line 32 intersects an extension direction of the first connection line segment 26 or the second connection line segment 27, bridge-connection may be needed at a position where the protective line 32 overlaps with the first connection line segment 26 or the second connection line segment 27. As a result, the wiring is complicated. Such a problem can be avoided when the protective line 32 and the pixel electrode 57 are arranged in a same layer. The protective line 32 and the pixel electrode 57 can be formed using a same mask, thereby saving the process cost.

Figure 23:
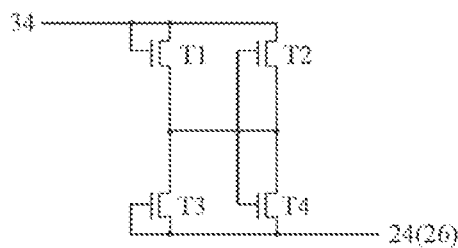
FIG. 23 is a schematic circuit structure diagram of an electrostatic protection circuit provided by an embodiment of the present disclosure.

FIG. 23 is a schematic circuit structure diagram of an electrostatic protection circuit 23 provided by an embodiment of the present disclosure. In addition, with reference to FIG. 21 and FIG. 23, the display panel may include an electrostatic protection circuit 33 located in the non-display region 2, and the electrostatic protection circuit 33 may be electrically connected to the scanning signal line Scan and the electrostatic discharge wiring 34, respectively. For example, the electrostatic protection circuit 33 may include a first transistor T1, a second transistor T2, a third transistor T3, and a fourth transistor T4. A gate electrode of the third transistor T3, a first electrode of the third transistor T3 and a first electrode of the fourth transistor T4 are electrically connected to the first connection line segment 26, respectively. A gate electrode of the fourth transistor T4, a second electrode of the fourth transistor T4, a second electrode of the third transistor T3, a first electrode of the first transistor T1, a gate electrode of the second transistor T2 and a first electrode of the second transistor T2 are electrically connected to each other. A second electrode of the second transistor T2, a gate electrode of the first transistor T1, and a second electrode of the first transistor T1 are electrically connected to an electrostatic discharge line 34, respectively. The electrostatic protection circuit 33 is configured to protect the scanning signal line Scan from static electricity. When the electrostatic charge accumulated on the scanning signal line Scan is too much, it can be released by the electrostatic discharge line 34, thereby preventing the scanning signal line Scan from being broken down by static electricity.

Figure 24:
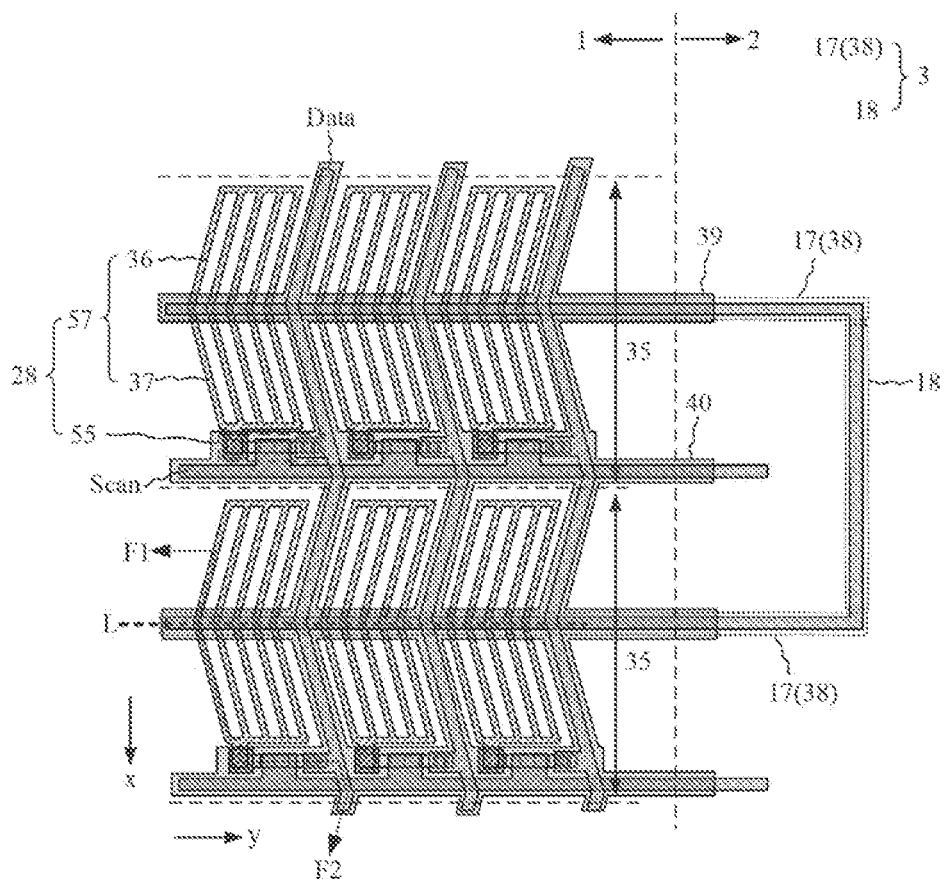
FIG. 24 is a schematic structural diagram of a display sub-pixel and a heating line provided by an embodiment of the present disclosure.
Figure 25:
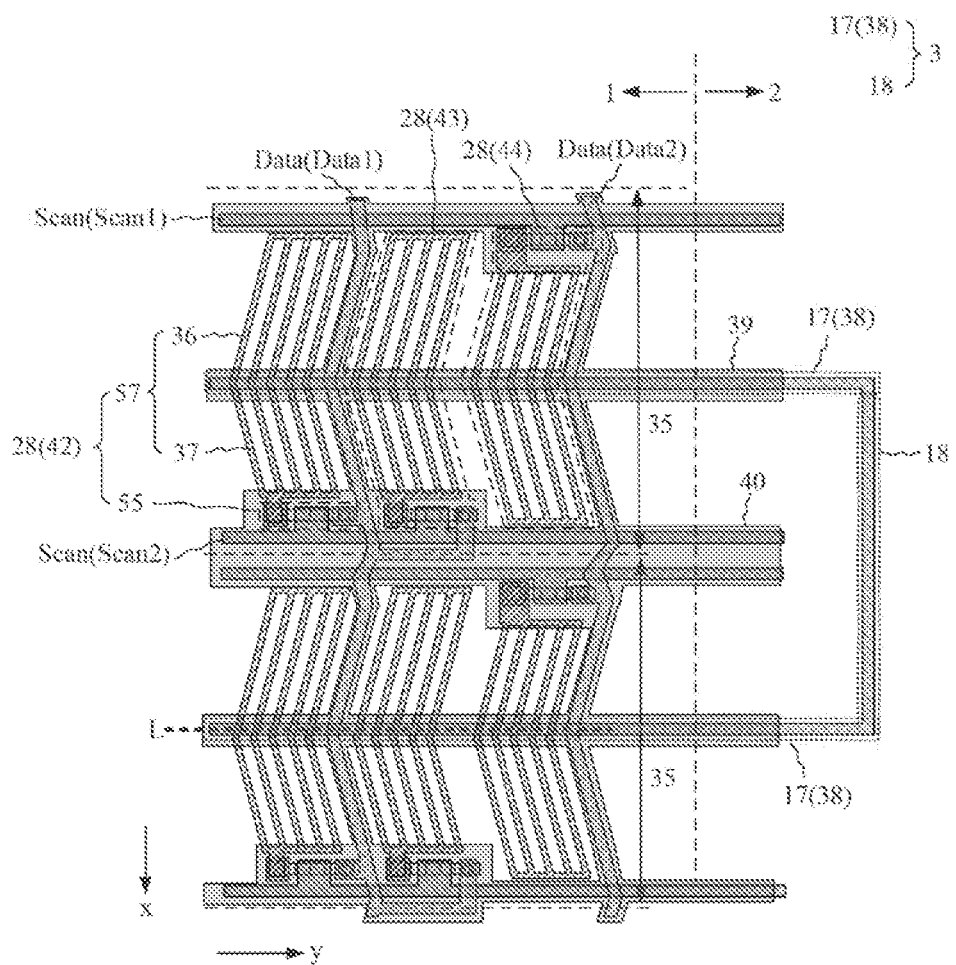
FIG. 25 is a schematic diagram of another structure of a display sub-pixel and a heating line provided by an embodiment of the present disclosure.
Figure 26:
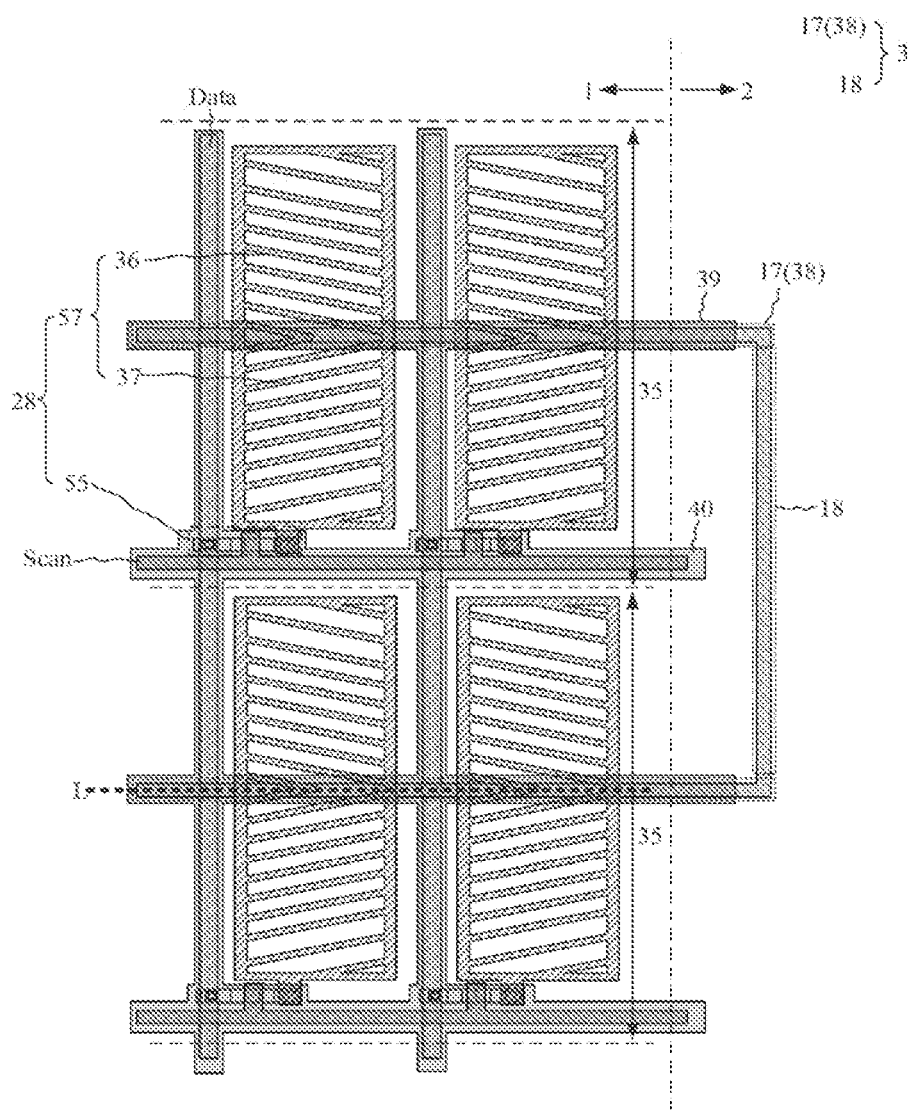
FIG. 26 is another structural schematic diagram of a display sub-pixel and a heating line provided by an embodiment of the present disclosure.

FIG. 24 is a schematic structural diagram of a display sub-pixel 28 and a heating line 3 provided by an embodiment of the present disclosure. FIG. 25 is a schematic diagram of another structure of a display sub-pixel 28 and a heating line 3 provided by an embodiment of the present disclosure. FIG. 26 is another structural schematic diagram of a display sub-pixel 28 and a heating line 3 provided by an embodiment of the present disclosure. In an embodiment of the present disclosure, as shown in FIG. 24 to FIG. 26, the display region 1 includes pixel rows 35 arranged along the first direction x, and each of the pixel rows 35 includes display sub-pixels 28 arranged along the second direction y intersecting the first direction x.

The display sub-pixel 28 has a true dual-domain structure. For example, the display sub-pixel 28 has a vertical domain structure as shown in FIG. 23 and FIG. 24, or a horizontal domain structure as shown in FIG. 25. The display sub-pixel 28 includes a pixel electrode 57, and the pixel electrode 57 includes a first electrode strip 36 and a second electrode strip 37. The first electrode strip 36 and the second electrode strip 37 are arranged along the first direction x, and extend along different directions.

The heating lines 3 are arranged along the first direction x, and each of the heating lines 3 includes a first part 38 extending along the second direction y. In a direction perpendicular to a plane of the display panel, the first part 38 overlaps with an inter-connection line L between the first electrode strip 36 and the second electrode strip 37 in the pixel row 35.

The heating line 3 may have a U-shaped structure. In this case, the first part 38 of the heating line 3 is the first heating line segment 17 of the heating line 3. Alternatively, the heating line 3 may have a strip-shaped structure that extends linearly. In this case, the first part 38 of the heating line 3 is a complete heating line 3.

When the display sub-pixel 28 is a true dual domain sub-pixel, electric fields having different directions can be formed between the first electrode strip 36 and the second electrode strip 37 in the pixel electrode 57 extending in different directions and the common electrode. Due to the two electric fields having different directions, the liquid crystal molecules at the positions of the two electrode strips rotate in different directions, and thus two domain regions can be formed at the positions of the two electrode strips to compensate for viewable angles in different directions.

In this configuration, the liquid crystal molecules at the inter-connection line L (domain line) between the first electrode strip 36 and the second electrode strip 37 usually has a low rotation efficiency, so the brightness of the display sub-pixel 28 at a position of the inter-connection line is much lower than that at other positions. In some embodiments of the present disclosure, the first part 38 overlaps with the inter-connection line L between the first electrode strip 36 and the second electrode strip 37. In this way, a sufficient distance is formed between the first part 38 and the scanning signal line Scan, and when heating the display panel, an interference of a heating signal transmitted on the first part 38 to a scanning signal transmitted on the scanning signal line Scan can be reduced, while the brightness of the display sub-pixel 28 is not greatly affected.

Figure 27:
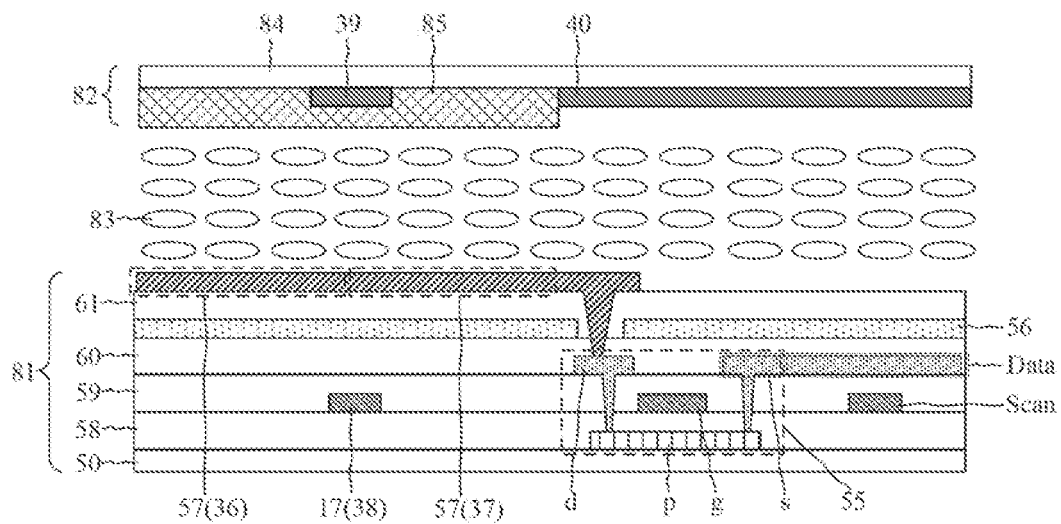
FIG. 27 is a cross-sectional view along F1-F2 shown in FIG. 24.

FIG. 27 is a cross-sectional view along F1-F2 shown in FIG. 24. With reference to FIG. 24 to FIG. 27, a first blocking part 39 is provided in the display region 1 and overlaps with the first part 38 in a direction perpendicular to the plane of the display panel.

At the inter-connection line L between the first electrode strip 36 and the second electrode strip 37, the deflection of the liquid crystal molecules is easily affected by the electric fields in different directions in the two domain regions at the same time, so this part of the liquid crystal molecules has a bad deflection state. In some embodiments of the present disclosure, the first blocking part 39 is provided at the inter-connection line L between the first electrode strip 36 and the second electrode strip 37, so that the first blocking part 39 can be used to block the light emitted at this position and thus increasing the contrast thereof, and the first blocking part 39 can also be used to block the first part 38 of the heating line 3 to prevent the first part 38 from being seen by human eyes.

With reference to FIG. 27, the display panel includes an array substrate 81 and a color filter substrate 82 disposed opposite to each other, and liquid crystal molecules 83 located between the array substrate 81 and the color filter substrate 82. The array substrate 81 may include structures such as a control transistor, a pixel electrode 57 and a common electrode 56. The color filter substrate 82 may include a second substrate 84, a color resist 85 and a black matrix 40 located at a side of the second substrate 84 facing the array substrate 81. In a direction perpendicular to the plane of the display panel, the black matrix 40 overlaps with the scanning signal line Scan, the data line Data and the control transistor 55, to block the scanning signal line Scan, the data line Data and the control transistor 55. In some embodiments of the present disclosure, the first blocking part 39 and the black matrix 40 can be formed using a same mask.

Figure 28:
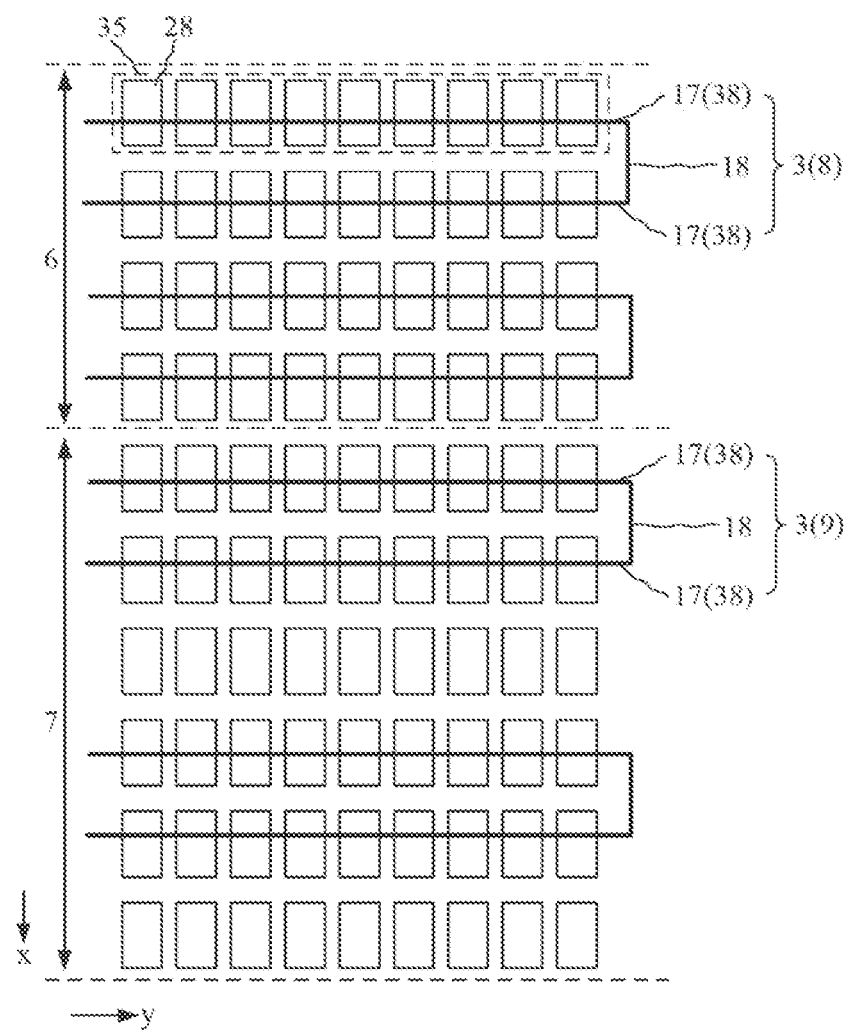
FIG. 28 is a schematic diagram of a configuration of a first part provided by an embodiment of the present disclosure.
Figure 29:
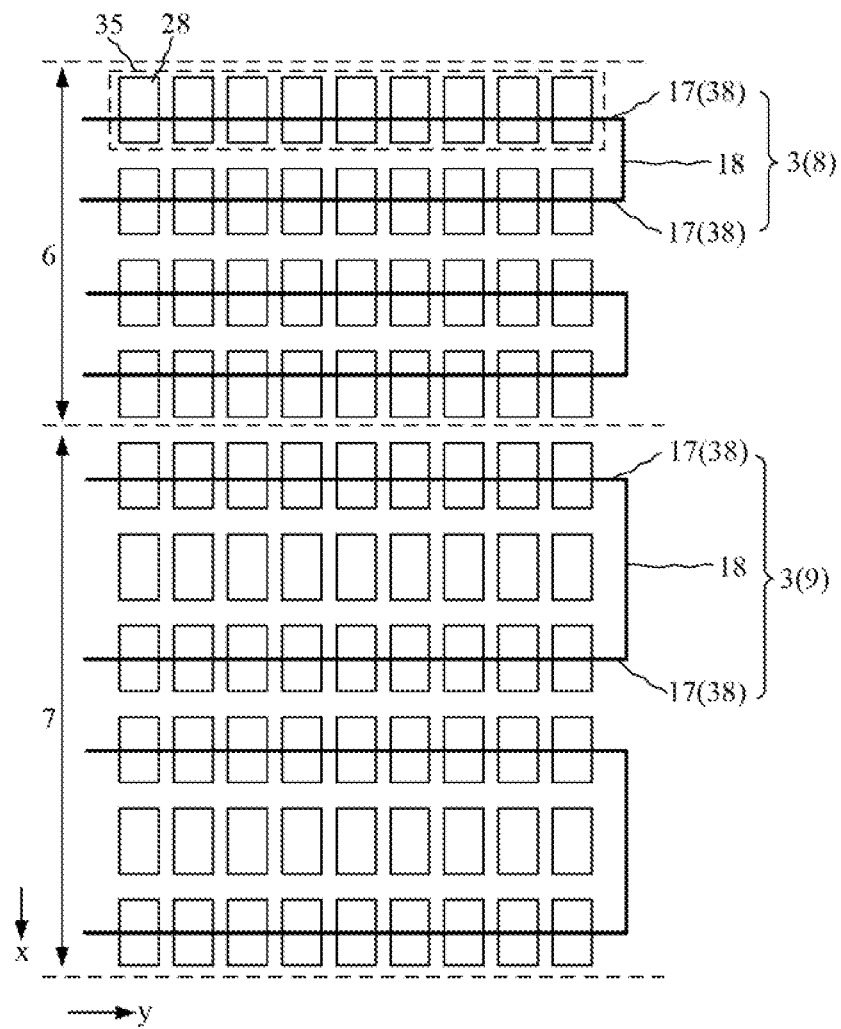
FIG. 29 is another schematic diagram of another configuration of a first part provided by an embodiment of the present disclosure.

FIG. 28 is a schematic diagram of a configuration of a first part 38 provided by an embodiment of the present disclosure. FIG. 29 is another schematic diagram of another configuration of a first part 38 provided by an embodiment of the present disclosure. In an embodiment of the present disclosure, as shown in FIG. 28 and FIG. 29, in the direction perpendicular to the plane of the display panel, the number of other pixel rows 35 between the pixel rows 35 overlapping with at least two adjacent first parts 38 in the first sub-region 6 is smaller than the number of other pixel rows 35 between the pixel rows 35 overlapping with at least two adjacent first parts 38 in the second sub-region 7.

In an embodiment of the present disclosure, the number of other pixel rows 35 between the pixel rows 35 overlapping with at least two adjacent first parts 38 in the first sub-region 6 can be zero.

Taking the U-shaped structure of the heating line 3 as an example, based on the configuration described above, with reference to FIG. 28, the number of pixel rows 35 between adjacent first heating lines 8 can be reduced, so that an arrangement density of the first heating lines 8 in the first sub-region 6 can be increased. Alternatively, with reference to FIG. 30, the number of pixel rows 35 between two first heating line segments 17 of a single first heating line 8 can be reduced, so that an extension length of a single first heating line 8 can be reduced, thereby reducing the resistance of the first heating line 8. Each configuration described above can increase the heating power of the first heating line 8 per unit area, thereby helping to improve the heating uniformity between the first sub-region 6 and the second sub-region 7.

With reference to FIG. 28 and FIG. 29, the heating line 3 has a U-shaped structure, and the heating line 3 includes two first heating line segments 17 extending in a same direction, and a second heating line segment 18 located between the two first heating line segments 17. The first heating line segment 17 is the first part 38.

With reference to FIG. 29, in the direction perpendicular to the plane of the display panel, the number of other pixel rows 35 between two pixel rows 35 overlapping with two first heating line segments 17 of the first heating line 8 is smaller than the number of other pixel rows 35 between two pixel rows 35 overlapping with two first heating line segments 17 of the second heating line 9.

In an embodiment of the present disclosure, the number of other pixel rows 35 between two pixel rows 35 overlapping with two first heating line segments 17 of the first heating line 8 is zero. In this way, an extension length of a single first heating line 8 can be reduced, thereby reducing the resistance of the first heating line 8.

And/or, with reference to FIG. 28, in the direction perpendicular to the plane of the display panel, the number of other pixel rows 35 between two pixel rows 35 overlapping with two closest first heating line segments 17 of first heating line segments 17 of adjacent first heating lines 8 is smaller than the number of other pixel rows 35 between two pixel rows 35 overlapping with two closest first heating line segments 17 of first heating line segments 17 of adjacent second heating lines 9.

In an embodiment of the present disclosure, the number of other pixel rows 35 between two pixel rows 35 overlapping with two closest first heating line segments 17 of first heating line segments 17 of adjacent first heating lines 8 is zero. In this way, a distance between two adjacent first heating lines 8 can be reduced, so that an arrangement density of the first heating lines 8 is increased, and an arrangement density of the first heating lines 8 can be increased.

When the heating line 3 and the scanning signal line Scan are arranged in a same layer, the scanning signal line Scan, the data line Data and the display sub-pixel 28 may adopt the following two connection manners.

In a first connection manner, with reference to FIG. 24, the display sub-pixels 28 in one pixel row 35 are electrically connected to one scanning signal line Scan, and the display sub-pixels 28 in one column is electrically connected to one data line Data.

Based on this connection manner, when the display panel is driven to display an image, multiple scanning signal lines Scan sequentially provide effective levels to multiple pixel rows 35 to control the pixel rows 35 to turn on sequentially. When a pixel row 35 is turned on, the data line Data writes data voltages to the display sub-pixels 28 in the pixel row 35.

In a second connection manner, with reference to FIG. 25, the display sub-pixels 28 includes a first display sub-pixel 42, a second display sub-pixel 43 and a third display sub-pixel 44. For example, the first display sub-pixel 42 may be a red sub-pixel, the second display sub-pixel 43 may be a green sub-pixel, and the third display sub-pixel 44 may be a blue sub-pixel. The pixel row 35 includes a first display sub-pixel 42, a second display sub-pixel 43 and a third display sub-pixel 44 arranged along the second direction y.

The scanning signal lines Scan include a first scanning line Scan1 and a second scanning line Scan2, and the data lines Data include a first data line Data1 and a second data line Data2. The first display sub-pixel 42 and the third display sub-pixel 44 are electrically connected to the first scanning line Scan1, and the second display sub-pixel 43 is electrically connected to the second scanning line Scan2. The first display sub-pixel 42 and the second display sub-pixel 43 are electrically connected to the first data line Data1, and the third display sub-pixel 44 is electrically connected to the second data line Data2.

Based on this connection manner, the first scanning line Scan1 and the second scanning line Scan2 transmit effective levels to the pixel row 35 connected thereto in a time division manner. When the first scanning line Scan1 transmits an effective level, the first display sub-pixel 42 and the third display sub-pixel 44 in the pixel row 35 are turned on. At this time, the first data line Data1 and the second data line Data2 transmit data voltages, respectively, and a data voltage transmitted on the first data line Data1 is written into the first display sub-pixel 42, and a data voltage transmitted on the second data line Data2 is written into the second display sub-pixel 43. When the second scanning line Scan2 transmits an effective level, the second display sub-pixel 43 in pixel row 35 is turned on. At this time, the first data line Data1 transmits a data voltage, and a data voltage transmitted on the first data line Data1 is written into the second display in sub-pixel 43.

Figure 30:
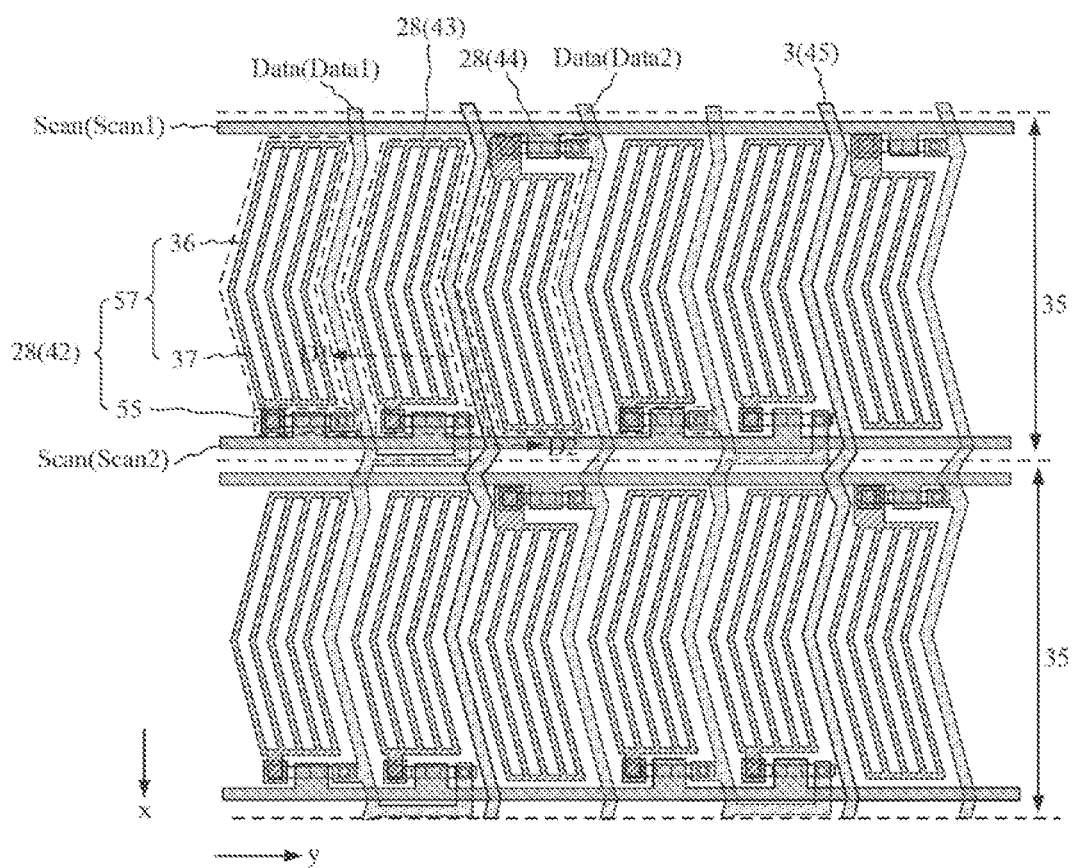
FIG. 30 is another structural schematic diagram of a display sub-pixel and a heating line provided by an embodiment of the present disclosure.
Figure 31:
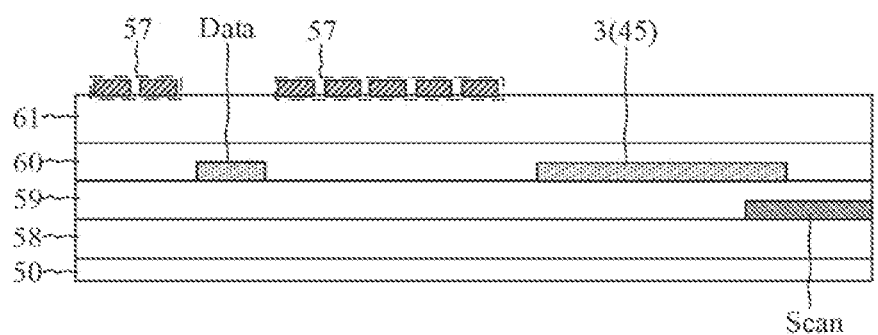
FIG. 31 is a cross-sectional view along D1-D2 shown in FIG. 30.

FIG. 30 is another structural schematic diagram of a display sub-pixel 28 and a heating line 3 provided by an embodiment of the present disclosure. FIG. 31 is a cross-sectional view along D1-D2 shown in FIG. 30. A scanning signal line Scan and a data line Data are provided in the display region 1, the scanning signal line Scan extends along the second direction y, and an extension direction of the data line Data intersects an extension direction of the scanning signal line Scan. For example, when the display sub-pixel 28 has a true dual-domain structure, the data line Data may extend along a polyline.

The heating lines 3 are arranged along the second direction y, and each of the heating lines 3 includes a second part 45 extending in the same direction as the data line Data and arranged in the same layer as the data line Data.

The heating line 3 may have a U-shaped structure, and in this case, the second part 45 of the heating line 3 is the first heating line segment 17 of the heating line 3. Alternatively, the heating line 3 can also be a strip-shaped structure extending along a straight line. In this case, the second part 45 of the heating line 3 is a complete heating line 3.

Since the second part 45 of the heating line 3 extends in the same direction as the data line Data, when the heating line 3 and the data line Data are arranged in a same layer, on the one hand, an extension direction of the second part 45 of the heating line 3 does not intersect an extension direction of the data line Data, thereby avoiding a risk of short circuit between heating line 3 and data line Data; and on the other hand, there is no need to provide an additional process for the heating line 3, and the heating line 3 and data line Data can be formed with a same mask, thereby simplifying the process and reducing the process cost.

With reference to FIG. 30, pixel rows 35 are provided in the display region 1 and arranged along the first direction x, and each of the pixel rows 35 includes pixels arranged along the second direction y. The pixel includes a first display sub-pixel 42, a second display sub-pixel 43 and a third display sub-pixel 44 arranged along a second direction y intersecting the first direction x.

The scanning signal lines Scan include a first scanning line Scan1 and a second scanning line Scan2, and the data lines Data include a first data line Data1 and a second data line Data2. The first display sub-pixel 42 and the third display sub-pixel 44 are electrically connected to the first scanning line Scan1, the second display sub-pixel 43 is electrically connected to the second scanning line Scan2, the first display sub-pixel 42 and the second display sub-pixel are electrically connected to the first data line Data1, and the third display sub-pixel 44 is electrically connected to the second data line Data2. A working principle of the scanning signal line Scan, the data line Data and the display sub-pixel 28 adopting this connection manner has been described in the above-mentioned embodiments and will not be repeated herein.

No data line Data is provided at a first side of the second display sub-pixel 43 in the second direction y, and the second part 45 is located at the first side of the second display sub-pixel 43.

When the scanning signal line Scan, the data line Data, and the display sub-pixel 28 adopt the above-mentioned connection manner, three columns of display sub-pixels 28 only need to be provided with two corresponding data lines Data. In this case, a position that would otherwise be used for arranging the data line Data at a side of the second display sub-pixel 43 can be saved to accommodate the second part 45 of the heating line 3, so that the space for the second part 45 of the heating line 3 can be allocated reasonably. In this way, it can avoid an extremely small distance between the heating line 3 and the data line Data due to the heating line 3 and the data line Data being arranged at a same side of the display sub-pixel 28. Then, when heating the display panel, a mutual interference of the heating signal to the data signal can be reduced.

Figure 32:
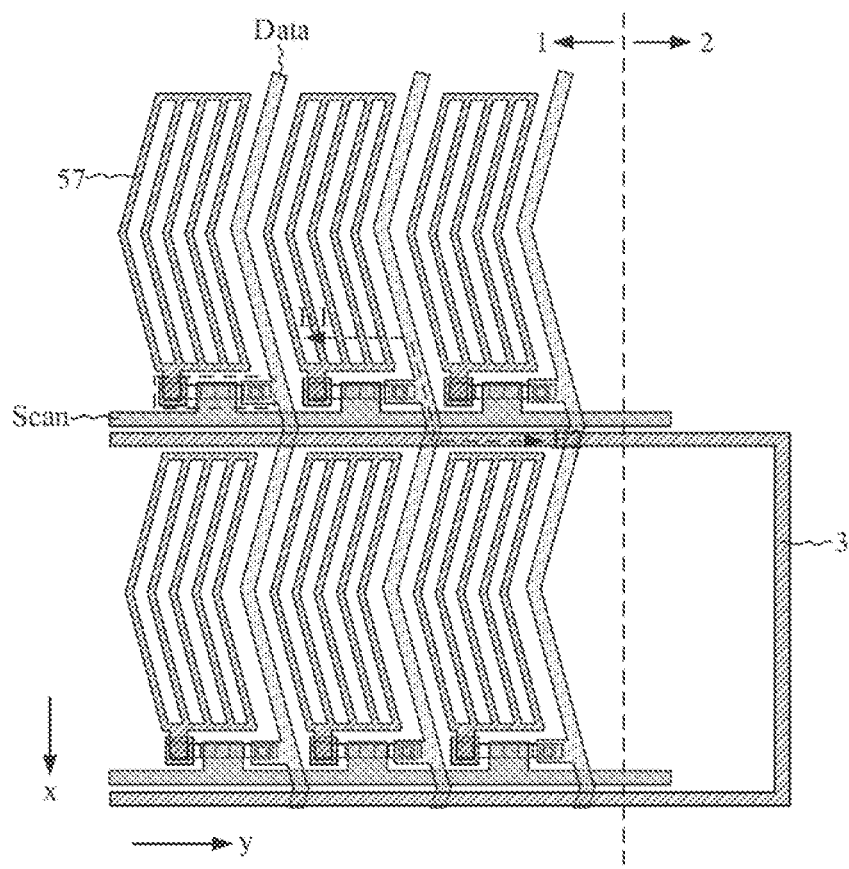
FIG. 32 is a schematic diagram of another layer structure of a display panel provided by an embodiment of the present disclosure.
Figure 33:
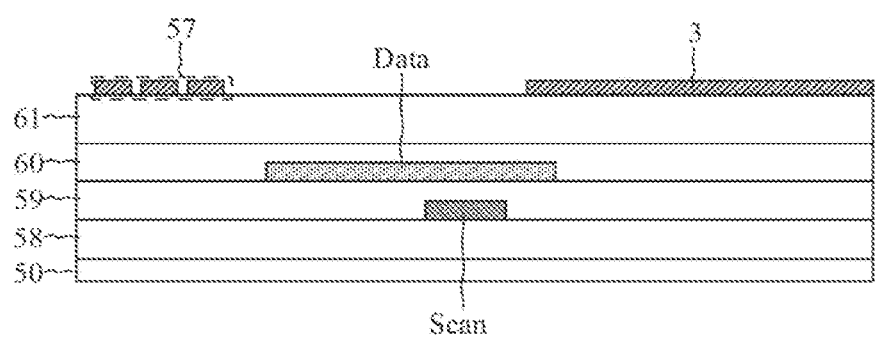
FIG. 33 is a cross-sectional view along E1-E2 shown in FIG. 32.

FIG. 32 is a schematic diagram of another layer structure of a display panel provided by an embodiment of the present disclosure. FIG. 33 is a cross-sectional view along E1-E2 shown in FIG. 32. In an embodiment of the present disclosure, as shown in FIG. 32 and FIG. 33, display sub-pixels 28 are provided in the display region 1, and the display sub-pixel 28 includes a pixel electrode 57 arranged in a same layer as the heating line 3.

With reference to FIG. 5, the common electrode 56 and the pixel electrode 57 in the display panel can be arranged in two oxide semiconductor layers. The common electrode 56 has a hollow region, which is for avoiding the via between the pixel electrode 57 and the control transistor 55. If the heating line 3 and the common electrode 56 are arranged in a same layer, the continuous common electrode 56 needs to be divided into multiple independent electrode blocks, and then the heating line 3 is arranged in a gap between the electrode blocks. Such configuration is not conducive to the connection of the common electrode 56 and the common voltage signal line. The position of the heating line 3 needs to be considered to avoid the via between the pixel electrode 57 and the control transistor 55, which also brings certain restrictions on the arrangement of the heating line 3.

If the heating line 3 and the pixel electrode 57 are arranged in a same layer, since the pixel electrode 57 is an independent electrode block, the heating line 3 can be arranged to directly extend between adjacent pixel electrodes 57. Such a configuration does not affect an original structure of the common electrode 56 and the pixel electrode 57 and can also bring a simpler layout design of the display panel.

Figure 34:
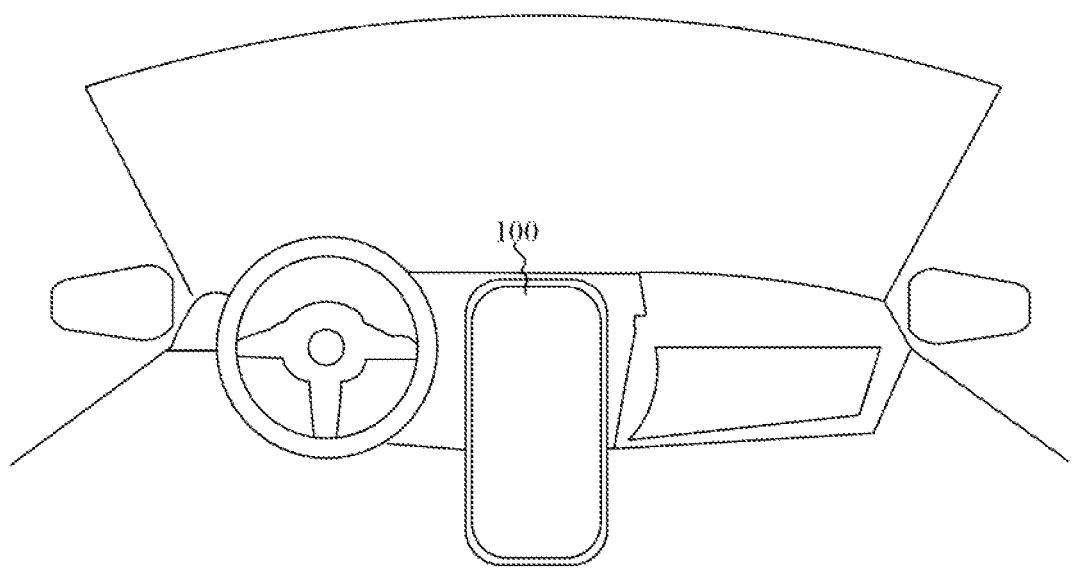
FIG. 34 is a schematic structural diagram of a display device provided by an embodiment of the present disclosure.

Some embodiments of the present disclosure provide a display device. FIG. 34 is a schematic structural diagram of a display device provided by an embodiment of the present disclosure. As shown in FIG. 34, the display device includes the above-mentioned display panel 100. A specific structure of the display panel 100 has been described in detail in the above-mentioned embodiments and will not be repeated herein. The display device shown in FIG. 34 is merely a schematic illustration, and the display device may be any electronic device with a display function, such as a vehicle display screen, a mobile phone, a tablet computer, a notebook computer, an electronic paper book, or a television.

The above-described embodiments are merely exemplary embodiments of the present disclosure and are not intended to limit the present disclosure. Any modifications, equivalent substitutions, and improvements made within the principle of the present disclosure shall fall into the protection scope of the present disclosure.

Finally, the above-described embodiments are merely for illustrating the present disclosure and are not intended to limit the present disclosure. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A display panel, having a display region and a non-display region, and comprising:
   heating lines, each of which comprises at least part located in the display region; and
   at least one heating bus and at least one power supply pin that are located in the non-display region, wherein the at least one heating bus is electrically connected to the at least one power supply pin and the heating lines;
   wherein the display region comprises a first sub-region and at least one second sub-region, the heating lines comprise at least one first heating line and at least one second heating line, one of the at least one first heating line is located in the first sub-region, and one of the at least one second heating line is located in one of the at least one second sub-region;

wherein a length of one of the at least one heating bus connected between one of the at least one first heating line and one of the at least one power supply pin is greater than a length of the one of the at least one heating bus connected between one of the at least one second heating line and the one of the at least one power supply pin; and wherein one of the at least one first heating line has a line width larger than a line width of one of the at least one second heating line; or one of the at least one first heating line has a resistivity smaller than a resistivity of one of the at least one second heating line; or one of the at least one first heating line comprises a first line segment connected to the at least one heating bus and at least one second line segment connected in parallel to the first line segment.

2. The display panel according to claim 1, wherein, in a condition where the one of the at least one first heating line comprises the first line segment connected to the at least one heating bus and the at least one second line segment connected in parallel to the first line segment, the at least one first heating line comprises at least two first heating lines, each of which comprises the at least one second line segment, and wherein along a direction from the first sub-region to the at least one second sub-region, numbers of the at least one second line segment of the at least two first heating lines decrease.

3. The display panel according to claim 1, wherein the display region and the at least one power supply pin are arranged along a first direction;
wherein the heating bus comprises a first heating bus and a second heating bus, and the at least one power supply pin comprises a first power supply pin electrically connected to the first heating bus and a second power supply pin electrically connected to the second heating bus;
wherein the heating lines are arranged along the first direction; and in a second direction, the first heating bus extends to the first power supply pin at least one side of the display region, and the second heating bus extends to the second power supply pin at least one side of the display region, and the first direction intersects the second direction; and
wherein the first sub-region and the at least one second sub-region are arranged along the first direction, and the first sub-region is located at a side of one of the at least one second sub-region away from the at least one power supply pin.

4. The display panel according to claim 3, wherein the display panel has a size in the first direction that is larger than a size of the display panel in the second direction.

5. The display panel according to claim 1, wherein one of the heating lines has a U-shaped structure and comprises two first heating line segments extending in a same direction and a second heating line segment located between the two first heating line segments, wherein the second heating line segment is located in the non-display region.

6. The display panel according to claim 5, further comprising:
a dummy sub-pixel located in the non-display region, wherein, in a direction perpendicular to a plane of the display panel, the second heating line segment overlaps with the dummy sub-pixel.

7. The display panel according to claim 5, further comprising:

a circuit located in a non-display region, wherein, in a direction perpendicular to a plane of the display panel, the second heating line segment overlaps with the circuit.

8. The display panel according to claim 7, further comprising:
a scanning signal line located in the display region and extending along a second direction,
wherein the circuit comprises a shift register circuit electrically connected to the scanning signal line, wherein the shift register circuit is located at at least one side of the display region along the second direction; and
wherein each of the two first heating line segments extends along the second direction, and the second heating line segment overlaps with the shift register circuit in a direction perpendicular to the plane of the display panel.

9. The display panel according to claim 5, wherein the second heating line segment has a line width larger than a line width of each of the two first heating line segments.

10. The display panel according to claim 5, further comprising:
a scanning signal line provided in the display region and extending along a second direction, wherein each of the two first heating line segments extends along the second direction, and wherein the heating lines and the scanning signal line are arranged in a same layer.

11. The display panel according to claim 10, further comprising:
a gate drive circuit provided in the non-display region,
wherein the scanning signal line is electrically connected to the gate drive circuit through a connection line extending in the non-display region; and
wherein the connection line comprises a first connection line segment and a second connection line segment that are electrically connected to each other, wherein the first connection line segment and the scanning signal line are arranged in a same layer, the second connection line segment and the scanning signal line are arranged in different layers, and the second heating line segment overlaps with the second connection line segment in a direction perpendicular to a plane of the display panel.

12. The display panel according to claim 11, further comprising:
a data line arranged in the display region and extending along a direction intersecting the second direction, wherein the second connection line segment and the data line are arranged in a same layer; and
a display sub-pixel arranged in the display region and comprising a pixel electrode, wherein the first connection line segment is bridge-connected to the second connection line segment through an auxiliary connection part arranged in a same layer as the pixel electrode.

13. The display panel according to claim 11, further comprising:
a protective line provided in the non-display region, wherein the first connection line segment and the second connection line segment are electrically connected to each other through connection vias, wherein the protective line surrounds the connection vias, and wherein the protective line is configured to receive a first voltage smaller than a low-level voltage received by the scanning signal line.

14. The display panel according to claim 1, further comprising:

display sub-pixels, wherein at least two display sub-pixels of the display sub-pixels are arranged along a second direction intersecting a first direction to form each pixel row of pixel rows of the display panel, the pixel rows are arranged in the display region along the first direction;

wherein one of the display sub-pixels have a true dual-domain structure, each of the display sub-pixels comprises a pixel electrode, and the pixel electrode comprises a first electrode strip and a second electrode strip, and wherein the first electrode strip and the second electrode strip are arranged along the first direction and extend in different directions, respectively; and wherein the heating lines are arranged along the first direction, each of the heating lines comprises a first part extending along the second direction, and in a direction perpendicular to a plane of the display panel, the first part overlaps with an inter-connection line located between the first electrode strip and the second electrode strip in one pixel row of the pixel rows.

15. The display panel according to claim 14, further comprising:
a first blocking part arranged in the display region, wherein the first blocking part overlaps with the first part in the direction perpendicular to the plane of the display panel.

16. The display panel according to claim 14, wherein in the direction perpendicular to the plane of the display panel, a number of at least one another pixel row of the pixel rows that is arranged between at least two of the pixel rows overlapping with at least two adjacent first parts of the first parts of the heating lines in the first sub-region is smaller than a number of at least another pixel row of the pixel rows that is arranged between at least another two of the pixel rows overlapping with at least another two adjacent first parts of the first parts in the second sub-region.

17. The display panel according to claim 16, wherein one of the heating lines has a U-shaped structure and comprises two first heating line segments extending in a same direction and a second heating line segment located between the two first heating line segments, and each of the first heating line segments is the first part; and wherein in the direction perpendicular to the plane of the display panel, a number of at least one another pixel row of the pixel rows that is arranged between two of the pixel rows overlapping with the two first heating line segments of the first heating line is smaller than a number of at least another pixel row of the pixel rows arranged between two of the pixel rows overlapping with the two first heating line segments of the second heating line; and/or wherein at least one first heating line comprises at least two first heating lines, and at least one second heating line comprises at least two second heating line; and in the direction perpendicular to the plane of the display panel, a number of at least one another pixel row of the pixel rows that is arranged between two of the pixel rows overlapping with two closest first heating line of the first heating line segments of adjacent first heating lines of the at least two first heating lines is smaller than a number of at least one another pixel row of the pixel rows that is arranged between two of the pixel rows overlapping with two closest first heating line of the first heating line segments of adjacent second heating lines of the at least two second heating lines.

18. A display panel, having a display region and a non-display region, and comprising:
heating lines, each of which comprises at least part located in the display region; and
at least one heating bus and at least one power supply pin that are located in the non-display region, wherein the at least one heating bus is electrically connected to the at least one power supply pin and the heating lines;
wherein the display region comprises a first sub-region and at least one second sub-region, the heating lines comprise at least one first heating line and at least one second heating line, one of the at least one first heating line is located in the first sub-region, and one of the at least one second heating line is located in one of the at least one second sub-region;
wherein a length of one of the at least one heating bus connected between one of the at least one first heating line and one of the at least one power supply pin is greater than a length of the one of the at least one heating bus connected between one of the at least one second heating line and the one of the at least one power supply pin;
wherein the at least one first heating line comprises at least two first heating lines, and the at least one second heating line comprises at least two second heating lines, wherein a distance between two adjacent first heating lines of the at least two first heating lines is smaller than a distance between two adjacent second heating lines of the at least two second heating lines.

19. A display panel, having a display region and a non-display region, and comprising:
heating lines, each of which comprises at least part located in the display region; and
at least one heating bus and at least one power supply pin that are located in the non-display region, wherein the at least one heating bus is electrically connected to the at least one power supply pin and the heating lines;
wherein the display region comprises a first sub-region and at least one second sub-region, the heating lines comprise at least one first heating line and at least one second heating line, one of the at least one first heating line is located in the first sub-region, and one of the at least one second heating line is located in one of the at least one second sub-region;
wherein a length of one of the at least one heating bus connected between one of the at least one first heating line and one of the at least one power supply pin is greater than a length of the one of the at least one heating bus connected between one of the at least one second heating line and the one of the at least one power supply pin;
wherein an arrangement density of the at least one first heating line is greater than an arrangement density of the at least one second heating line, and/or, a resistance of one of the at least one first heating line is smaller than a resistance of one of the at least one second heating line;
wherein the display region and the at least one power supply pin are arranged along a first direction;
wherein the at least one heating bus comprises a first heating bus and a second heating bus, and the at least one power supply pin comprises a first power supply pin electrically connected to the first heating bus and a second power supply pin electrically connected to the second heating bus;
wherein the heating lines are arranged along a second direction intersecting the first direction, the first heating bus surrounds the display region and is electrically connected to an end of each of the heating lines away from the power supply pin, the second heating bus is located at a side of the display region close to one of the at least one power supply pin and is electrically connected to an end of each of the heating lines close to the one of the at least one power supply pin, the first heating bus comprises two ends each connected to the first power supply pin, and the second heating bus comprises two ends each connected to the second power supply pin; and wherein at least one second sub-region comprises two second sub-regions, the first sub-region and the two second sub-regions are arranged along the second direction, and the first sub-region is located between the two second sub-regions.

20. The display panel according to claim 19, wherein the display panel has a size in the second direction larger than a size of the display panel in the first direction.

* * * * *